United States Patent
Hirata et al.

(10) Patent No.: US 6,339,375 B1
(45) Date of Patent: Jan. 15, 2002

(54) IMAGE MONITORING APPARATUS AND IMAGE MONITORING METHOD

(75) Inventors: Nami Hirata; Manabu Hashimoto; Kazuhiko Sumi; Hiroshi Narasada, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/609,474

(22) Filed: Jun. 30, 2000

(30) Foreign Application Priority Data

Aug. 20, 1999 (JP) .......................... 11-234296

(51) Int. Cl.[7] .............................................. G08B 13/00
(52) U.S. Cl. .................... 340/541; 340/545.1; 187/392; 187/317
(58) Field of Search .............................. 340/541, 545.1; 187/392, 317, 391, 380

(56) References Cited

U.S. PATENT DOCUMENTS

| | | | |
|---|---|---|---|
| 4,732,238 A | * 3/1988 | Baumgartner | 187/104 |
| 4,874,063 A | * 10/1989 | Taylor | 187/392 |
| 5,313,295 A | 5/1994 | Taniguchi et al. | 348/149 |
| 5,387,768 A | * 2/1995 | Izard et al. | 187/392 |
| 5,569,888 A | * 10/1996 | Kamani et al. | 187/392 |
| 6,080,981 A | * 6/2000 | Payne | 340/545 |
| 6,167,991 B1 | * 1/2001 | Full et al. | 187/317 |

FOREIGN PATENT DOCUMENTS

| | | |
|---|---|---|
| JP | 5-6494 | 1/1993 |
| JP | 8-26611 | 1/1996 |

* cited by examiner

Primary Examiner—John Tweel
(74) Attorney, Agent, or Firm—Leydig, Voit & Mayer, Ltd.

(57) ABSTRACT

An image monitoring apparatus for detecting a confined passenger in an elevator just from an image, without using a dedicated sensor. The image monitoring apparatus includes an image acquirer for acquiring an image; a door area definer for defining a door defining area for the image; a door extracter for extracting a door image from the door defining area of the image; a door open/closed state sensor for determining whether the door is open or closed; a passenger area definer for defining a passenger defining area; a passenger extracter for extracting a passenger image from the passenger defining area of the image; a passenger presence determination for determining whether a passenger is present; a decision unit for determining whether a passenger is confined in the closed space by whether the door is open or closed and the passenger presence determination; and an alarm for issuing an alarm if a passenger has been confined in the closed space.

11 Claims, 16 Drawing Sheets

MONITORING CAMERA IN ELEVATOR CAR

IMAGE MONITORING APPARATUS AND IMAGE MONITORING METHOD

BACKGROUND OF THE INVENTION

1. Field of the Invention

The present invention relates to a monitoring apparatus and a monitoring method for monitoring an interior of a closed space for passengers which has an opening/closing door and, more particularly, to an image monitoring apparatus and an image monitoring method that makes it possible to detect a confined passenger or a passenger in need of care, or an equipment failure in, for example, a car of an unattended elevator, just from an image supplied by a monitoring camera.

2. Description of the Related Art

An elevator according to the prior art that is fully equipped with various dedicated sensors for primarily monitoring an open or closed state of a door is able to monitor a variety of states by combining diverse sensor outputs. Currently, however, there are many elevators not equipped with dedicated sensors in the market.

FIG. 13 is a block diagram illustrating another prior art disclosed in Japanese Unexamined Patent Publication No. 8-26611. The block diagram shows a conventional monitoring technology described under a title "APPARATUS FOR DETECTING OBJECT IN ELEVATOR CAR." FIG. 14 is a schematic diagram of the prior art of FIG. 13. The technology described in the literature is for accurately detecting the number of passengers in a car without causing differences in heights of detection objects to deteriorate detection accuracy while preventing erroneous detection at the same time.

Referring to FIG. 13, the apparatus for detecting an object in a car is constituted by an image processor 2001, a television camera 2002, and a passenger detector 2005. An output of the apparatus is transmitted to an elevator controller 2003, and used for carrying out elevator control.

A correction coefficient calculating unit 2011 calculates a correction coefficient for an area of an image of a detected passenger or the like based on a height of an image of a detection object at a particular position. A passenger detecting unit 2010 uses the correction coefficient calculated by the correction coefficient calculating unit 2011, corrects the area of the image of the detected passenger or the like, converts the area into a number of passengers, and outputs the number of passengers. Thus, the height of an object is detected, and a correction coefficient based on the detected height is calculated to correct an area of the object. Hence, the number of passengers in a car can be accurately detected.

There is still another prior art. FIG. 15 is a block diagram showing another conventional monitoring technology described in Japanese Unexamined Patent Publication No. 5-6494 titled "APPARATUS FOR MEASURING MOVING OBJECT AND TRAFFIC FLOW MEASURING IMAGE PROCESSOR." FIG. 16 schematically shows a monitoring camera installed in an elevator car.

The technology shown in FIG. 15 relates to the apparatus for measuring a moving object for detecting status amounts of a moving object and, more particularly, to a traffic flow measuring image processor for detecting status amounts, such as traffic amount, speed, car-to-car distance, density, occupancy, congestion distance, and time required for passing through a section, in an automobile traffic flow.

Referring to FIG. 15, a vehicle is imaged by a TV camera 3001 controlled by a TV camera control circuit 3002, and the image data is stored in a frame memory 3002. A presence area of the vehicle along a moving path of the vehicle is preset, based on the image data, by a presence area defining circuit 3009. A vertical line detecting circuit 3010 extracts data indicating the vehicle from the image data in the presence area, and the data indicating the vehicle is successively stored in a data time series storage circuit 3012 in time series at a predetermined cycle. Based on the data time series image obtained by the data time series storage circuit 3012, a vehicle determining circuit 3017 determines whether the vehicle moving in the preset presence area is present, and, if so, then a vehicle information measuring circuit 3018 measures a state of the determined vehicle.

Furthermore, according to the prior art shown in FIG. 13, even when the aforesaid dedicated sensors are provided, confinement is presumed by a combination of ON and OFF of sensor signals. Therefore, the prior art shown in FIG. 13 has been presenting a problem in that presence of a passenger in a car does not always coincide with presence of a passenger indicated by a sensor signal because, if a passenger presses a button of a destination floor provided in a car, then it automatically means that there is a passenger in the car.

The problem occurs especially when a child is in a car alone or if a passenger maliciously confines himself in the car.

Although the prior art of FIG. 15 is not intended for detecting a passenger confined in an elevator, if the art shown in FIG. 15 is used to create a confinement detecting apparatus, then a monitoring camera device as shown in FIG. 16 will be installed. The prior art shown in FIG. 15 has also been posing a problem in that a confined passenger cannot be detected just from an image, requiring a dedicated sensor be separately provided, as in the case of an elevator not equipped with a dedicated sensor.

More specifically, in the prior art of FIG. 15, separately existing objects at a substantially constant speed in a view can be recognized. It has been difficult, however, to recognize moving objects in a picture supplied by a monitoring camera showing a mixture of a moving door and moving passengers as in the case of, for example, a picture provided by a camera installed in an elevator car.

Therefore, the prior art of FIG. 15 has been posing a problem in that it is difficult to detect confined passengers from a picture where different movements exist if the prior art is applied as it is for detecting confined passengers, although the prior art of FIG. 15 is not intended for detecting confined passengers.

SUMMARY OF THE INVENTION

Accordingly, the present invention has been made with a view toward solving the problems described above, and it is an object thereof to provide an image monitoring apparatus and an image monitoring method that allow a confined passenger to be detected just from an image without using a dedicated sensor.

To this end, according to one aspect of the present invention, there is provided an image monitoring apparatus for monitoring an interior of a closed space having an opening/closing door, including: image acquiring means provided in the space so that it faces the door to acquire an image of an interior of the space including the door; door area defining means for setting a predetermined door defining area for the image; door extracting means for extracting a door image from the door defining area of the image; door open/closed state determining means for determining whether the door is open or closed based on an output of the door extracting means; passenger area defining means for setting a predetermined passenger defining area for the image; passenger extracting means for extracting a passenger image from the passenger defining area of the image; passenger presence determining means for determining whether a passenger is present or not based on an output of the passenger extracting means; integrating means for determining whether a passenger is confined or not by integrating judgements of the door open/closed state determining means and the passenger presence determining means; and alarming means for issuing an alarm to outside if a passenger has been confined, based on an output of the integrating means.

In a preferred form, the door extracting means has: door highlighting means for highlighting a position of an edge of a door in the door defining area; data time series storing means for successively storing in time series door edge position data emphasizing the position of the edge of the door; and door operation extracting means for extracting an opening/closing operation of the door from the time series data, and the door open/closed state determining means determines whether the door is open or closed based on an output of the door operation extracting means.

The passenger extracting means has: an image temporary storage memory for temporarily saving a previous image; comparing means for performing comparison between an image in the temporary storage memory and an image acquired by the image acquiring means; and difference pixel number counting means for counting a number of pixels of a difference between the two images based on an output of the comparing means, wherein the passenger presence determining means determines whether there is a passenger or not based on an output of the difference pixel number counting means.

The image monitoring apparatus further includes destination floor recognizing means for recognizing a destination floor, and door operation timing calculating means for calculating a time before the door is opened next based on an output of the destination floor recognizing means, wherein the integrating means determines that a passenger has been confined based on determinations of the door open/closed state determining means and the passenger presence determining means and if the door is not opened when the time is reached.

According to another aspect of the present invention, there is provided an image monitoring apparatus for monitoring an opening/closing door, comprising: image acquiring means provided so that it faces the door to acquire an image including the door; door area defining means for setting a predetermined door defining area for the image; door extracting means for extracting a door image from the door defining area of the image; and door operation evaluating means for detecting whether the door is open or closed based on an output of the door extracting means and outputting a detection signal to an external device.

In a preferred form, the alarming means is provided remotely from the image acquiring means.

According to yet another aspect of the present invention, there is provided an image monitoring method for monitoring an interior of a closed space having an opening/closing door, comprising: an image acquiring step for acquiring an image of an interior of the space including the door by an image capturing device provided in the space so that it faces the door; a door area setting step for setting a predetermined door defining area for the image; a door extracting step for extracting a door image from the door defining area of the image; a door open/closed state determining step for determining whether the door is open or closed based on an output of the door extracting step; a passenger area setting step for setting a predetermined passenger defining area for the image; a passenger extracting step for extracting a passenger image from the passenger defining area of the image; a passenger presence determining step for determining whether a passenger is present or not based on an output of the passenger extracting step; an integrating step for determining whether a passenger is confined or not by integrating determination results of the door open/closed state determining step and the passenger presence determining step; and an alarming step for issuing an alarm to outside if a passenger has been confined, based on an output of the integrating step.

In a preferred form, the door extracting step includes: a door highlighting step for highlighting a position of an edge of a door in the door defining area; a data time series storing step for successively storing in time series door edge position data emphasizing the position of the edge of the door; and a door operation extracting step for extracting an opening/closing operation of the door from the time series data, wherein the door open/closed state determining step determines whether the door is open or closed based on an output of the door operation extracting step.

The passenger extracting step includes: an image temporary storage step for temporarily saving a previous image; a comparing step for performing comparison between an image saved in the temporary storage step and an image acquired by the image acquiring step; and a difference pixel number counting step for counting a number of pixels of a difference between the two images based on an output of the comparing step, wherein the passenger presence determining step determines whether there is a passenger or not based on an output of the difference pixel number counting step.

The image monitoring method further includes a destination floor recognizing step for recognizing a destination floor, and a door operation timing calculating step for calculating a time before the door is opened next based on an output of the destination floor recognizing step, wherein the integrating step determines that a passenger has been confined based on determination results of the door open/closed state determining step and the passenger presence determining step and if the door is not opened when the time is reached.

According to another aspect of the present invention, there is provided an image monitoring method for monitoring an opening/closing door, comprising: an image acquiring step for acquiring an image including the door by an image capturing device provided so that it faces the door; a door area setting step for setting a predetermined door defining area for the image; a door extracting step for extracting a door image from the door defining area of the image; and a door operation evaluating step for detecting whether the door is open or closed based on an output of the door extracting step and outputting a detection signal to an external device.

In a preferred form, the alarming step remotely issues an alarm to the image capturing device.

DESCRIPTION OF THE PREFERRED EMBODIMENTS

First Embodiment

Figure 1:
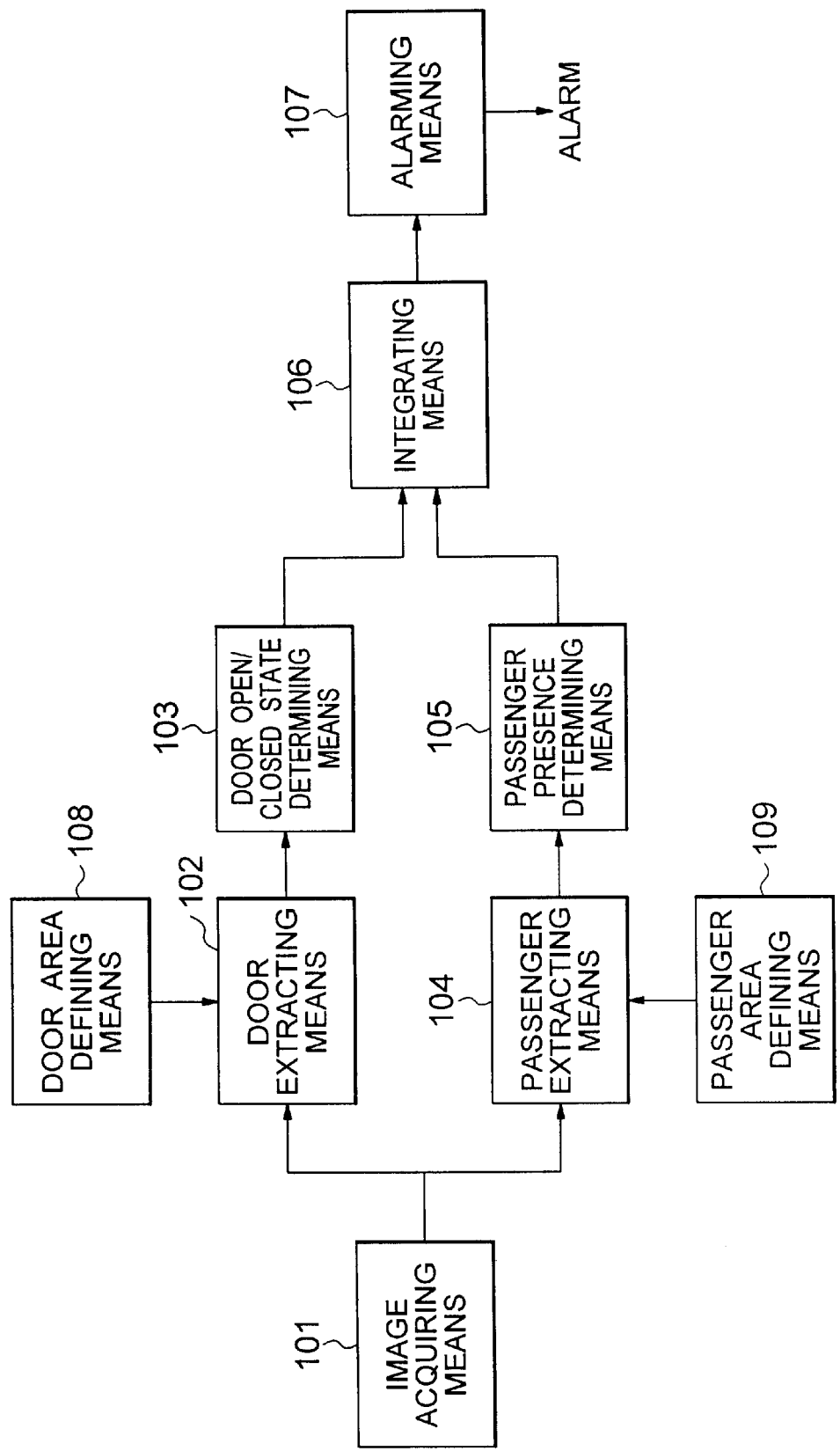
FIG. 1 is a block diagram showing an image monitoring apparatus in accordance with the present invention.
Figure 2:
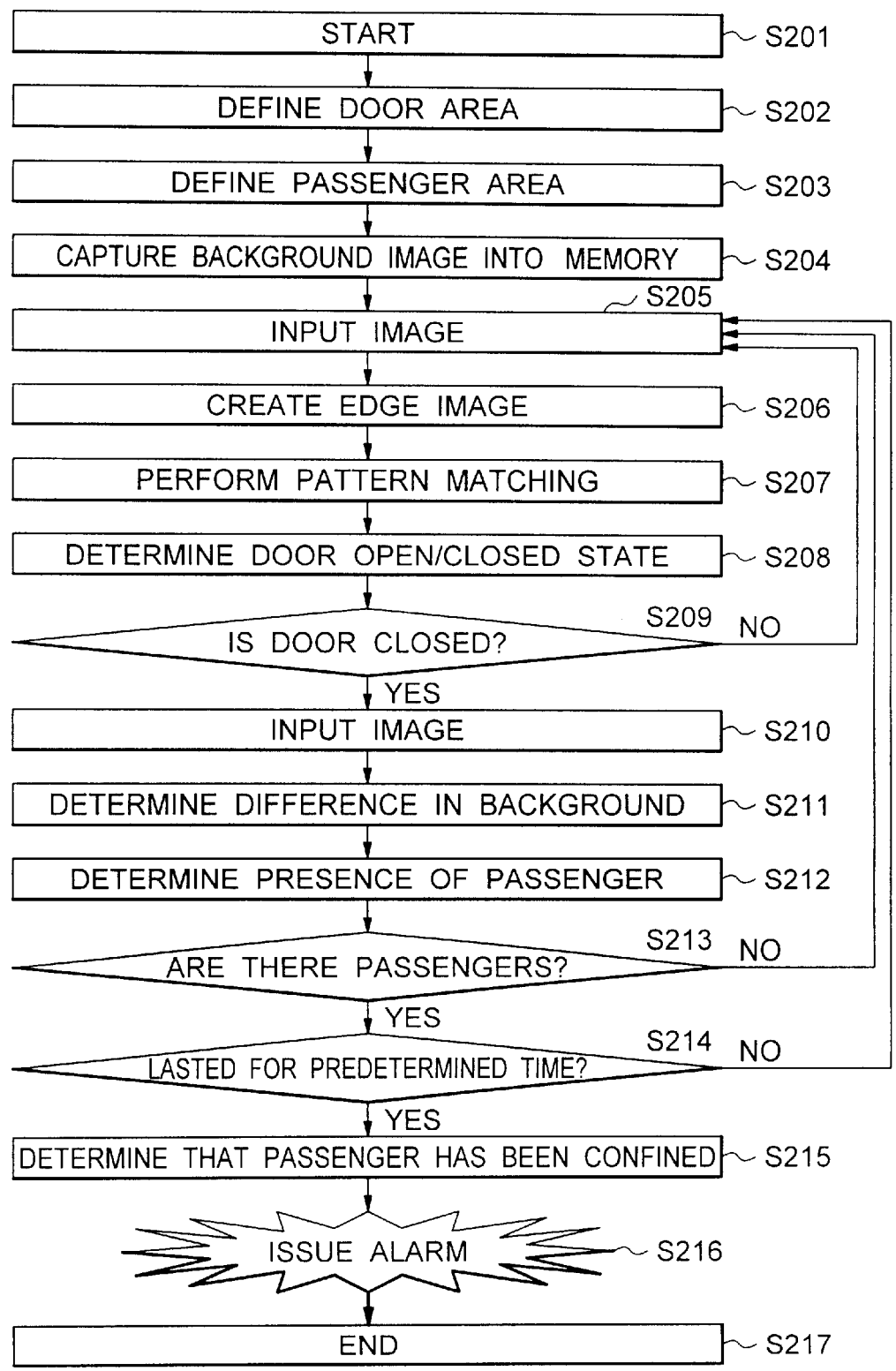
FIG. 2 is a flowchart showing an operation of the image monitoring apparatus.

FIG. 1 is a block diagram showing an image monitoring apparatus in accordance with the present invention, and FIG. 2 is a flowchart illustrating an operation of the image monitoring apparatus.

Referring to FIG. 1, the image monitoring apparatus includes: an image acquiring means 101 acting as an image capturing device for entering an image; a door area defining means 108 for setting an area of a door; a door extracting means 102 for extracting door operation information from an image area; a door open/closed state determining means 103 for determining whether an extracted candidate has its door opened, closed, or in the process of opening or closing; a passenger area defining means 109 for defining an area of passengers; a passenger extracting means 104 for extracting information regarding presence of a passenger from the defined image area; a passenger presence determining means 105 for determining presence of a passenger from the extracted information; an integrating means 106 for combining determination results of the door open/closed state and the presence of a passenger; and an alarming means 107 for issuing an alarm based on a combined determination result supplied by the integrating means 106.

The image acquiring means 101 serving as the image capturing device is, for instance, a monitoring camera installed in an elevator car. In this embodiment, pictures from the monitoring camera will be used to detect a confined passenger.

An operation of the image monitoring apparatus will be described in conjunction with the flowchart of FIG. 2. When the monitor is started, initialization is carried out first in a step S201, then an area of a door is defined by the door area defining means 108 in a step S202 (a door area setting step).

Furthermore, an area of passengers is defined by the passenger area defining means 109 in a step S203 (a passenger area setting step). In this embodiment, a difference in a background is found to recognize presence of a passenger; therefore, a background image is captured beforehand in a memory (not shown) in a step S204.

Then, a density-based image of an object to be recognized is entered by the image acquiring means 101 in a step S205 (an image acquiring step). The image acquiring means 101 is, for example, a monitoring camera installed in an elevator car as mentioned above, and the image acquiring means 101 is installed on a front wall with respective to a door.

Subsequently, in a step S206, the density-based image, which has been entered by the image acquiring means 101, is subjected to edge detection implemented in the door defining area that has been set. Based on the edge information, a vertical linear portion of a door edge is detected in a template matching process, and a door candidate is extracted in a step S207. The operations in the steps S206 and S207 are performed by the door extracting means 102 (a door extracting step).

Thereafter, based on an output of the door extracting means 102, the door open/closed state determining means 103 determines in a step S208 (a door open/closed state determining step) whether the door is open, closed, or in the process of opening or closing.

Subsequently, whether the door is closed or not is checked in a step S209, and if the door is open or in the process of opening or closing, then the operations of steps S205 through S209 are repeated. If the door is closed, then the density-based image of the object to be recognized, which has been obtained by the image acquiring means 101, is input in a step S210. On the set passenger defining area, a difference between the input image and a background image, which has been input in advance, is obtained by the passenger extracting means 104 in a step S211 (a passenger extracting step). Then, whether there is a passenger is determined by a passenger presence determining means 105 in a step S212 (a passenger presence determining step).

In a step S213, whether a passenger is present or not is determined, and if no passenger is present, then the program returns to the step S205 to repeat the aforesaid procedure. If a passenger is present, then the integrating means 106 determines whether the door has been closed and whether a state wherein the passenger is present has lasted for a predetermined time in a step S214 (an integrating step). The predetermined time is assumed to be, for example, about 40 to about 60 seconds used for current detection of a confinement.

If a result of the determination indicates that the door has been closed and the state wherein the passenger is present has lasted for the predetermined time, then it is determined that the passenger has been confined (a step S215), and an alarm is issued by the alarming means 107 before the procedure is terminated in a step S216 (an alarming step).

The following provides a summary of the procedure implemented by the image monitoring apparatus according to this embodiment having the construction described above. An image is input by the image acquiring means 101; a door area is defined by the door area defining means 108; door operation information is extracted from a defined image area by the door extracting means 102; whether a candidate extracted by the door open/closed state determining means 103 has its door open, closed, or in the process of opening or closing is determined by the door open/closed state determining means 103; a passenger area is defined by the passenger area defining means 109; information regarding presence of a passenger is extracted from an image area defined by the passenger extracting means 104; presence of a passenger is determined based on the information extracted by the passenger presence determining means 105; information regarding a door open/closed state and a result of the passenger presence determination are combined by the integrating means 106; and an alarm is issued by the alarming means 107 based on a result of the combined information and determination.

Thus, the image monitoring apparatus according to the embodiment performs the template matching on a portion for recognizing an open or closed door, and a difference in the background is identified in a portion for recognizing the presence of a passenger, thereby recognizing presence of a passenger. By combining the information regarding the door open/closed state and the information regarding the presence of a passenger, the image monitoring apparatus recognizes that the state wherein a passenger is present with the door closed has lasted for a predetermined time. The present invention makes it possible to detect a passenger confined in an elevator car just from an image acquired through a camera.

In this embodiment, the template matching based on an edge image has been used for the door extracting means 102. As an alternative, however, standard density-based image template matching, template matching based on a binary image produced by binarizing a density-based image, or a method for extracting a parametric pattern based on Hough transform or the like from an edge detection result may be used to obtain a characteristic pattern of a door edge for obtaining a candidate.

Furthermore, the procedure has been terminated upon the issuance of an alarm by the alarming means; however, the information may be further transmitted to a control center or the like by a transmitting means. This enables a further automated remote monitoring system to be accomplished.

Second Embodiment

Figure 3:
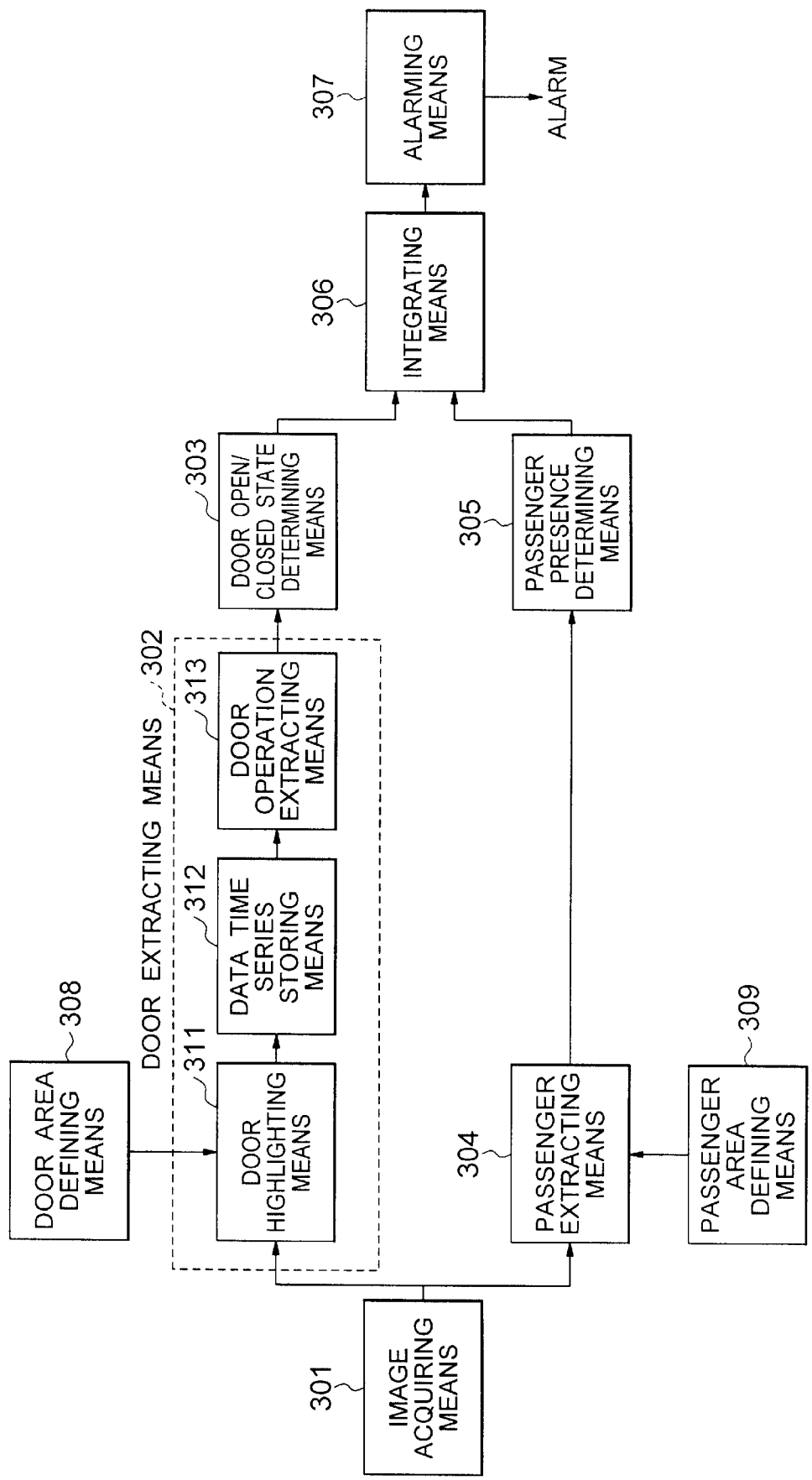
FIG. 3 is a block diagram showing another image monitoring apparatus in accordance with the present invention.
Figure 4:
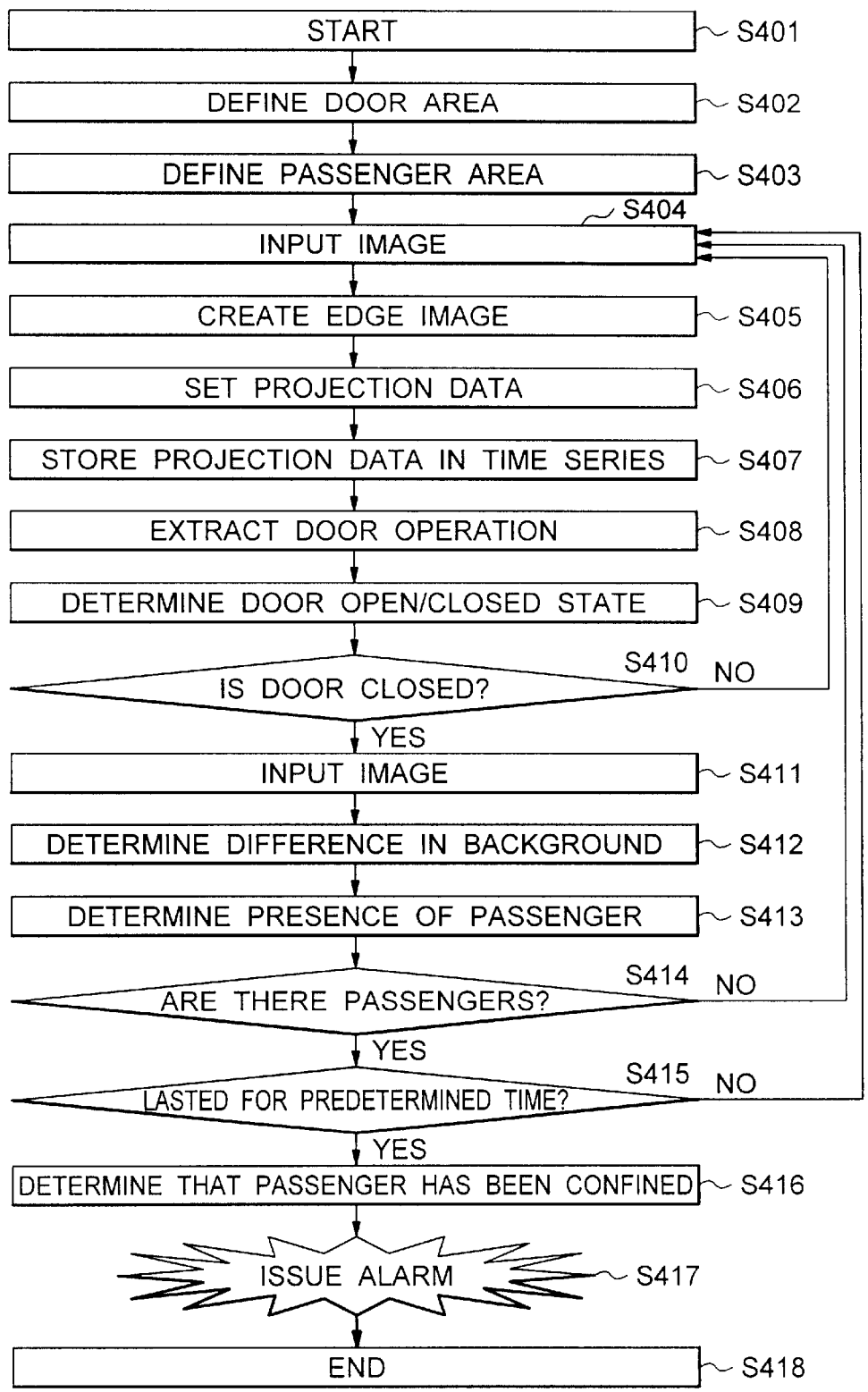
FIG. 4 is a flowchart showing an operation of the image monitoring apparatus.
Figure 5:
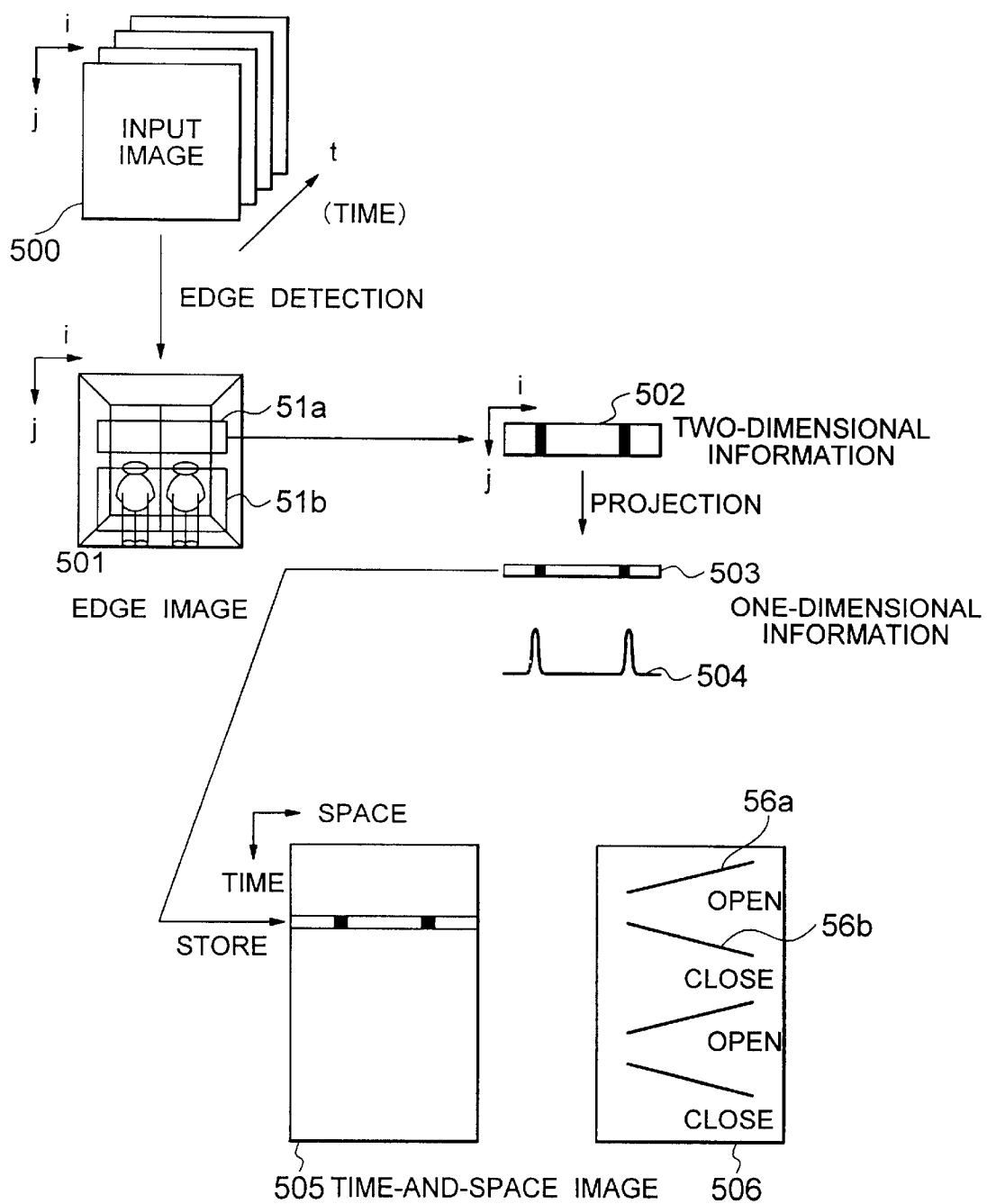
FIG. 5 is a diagram illustrating a flow of image data to be processed.

FIG. 3 is a block diagram showing another image monitoring apparatus in accordance with the present invention; FIG. 4 is a flowchart illustrating an operation of the image monitoring apparatus; and FIG. 5 is a diagram illustrating a flow of processing image data.

Referring to FIG. 3, the image monitoring apparatus includes: an image acquiring means 301 for entering an image; a door area defining means 308 for defining a door area; a door extracting means 302 for extracting information regarding a door operation from an image area; a door open/closed state determining means 303 for determining whether an extracted candidate has its door open, closed, or in the process of opening or closing; a passenger area defining means 309 for defining a passenger area; a passenger extracting means 304 for extracting information regarding presence of a passenger from a defined image area; a passenger presence determining means 305 for determining presence of a passenger based on the extracted information; an integrating means 306 for combining the information regarding a door open/closed state and the information regarding the presence of a passenger; and an alarming means 307 for issuing an alarm based on a result of combining the above information provided by the integrating means 306.

The door extracting means 302 has: a door highlighting means 311 for highlighting a position of an edge of a door in the door defining area; a data time series storing means 312 for successively storing in time series door edge position data emphasizing the position of the edge of the door; and a door operation extracting means 313 for extracting an opening/closing operation of the door from the time series data.

As in the case of the first embodiment, the image acquiring means 301 is, for example, a monitoring camera installed in an elevator car. In this embodiment, a confined passenger is detected using a picture captured by the monitoring camera.

The following will describe an operation of the image monitoring apparatus in conjunction with the flowchart shown in FIG. 4. When the monitor is started, initialization is carried out first in a step S401. Then, a door area is defined by the door area defining means 308 in a step S402, and a passenger area is defined by the passenger area defining means 309 in a step S403. For instance, reference numeral 51a in FIG. 5 denotes the door defining area, and reference numeral 51b denotes the passenger defining area.

Figure 16:
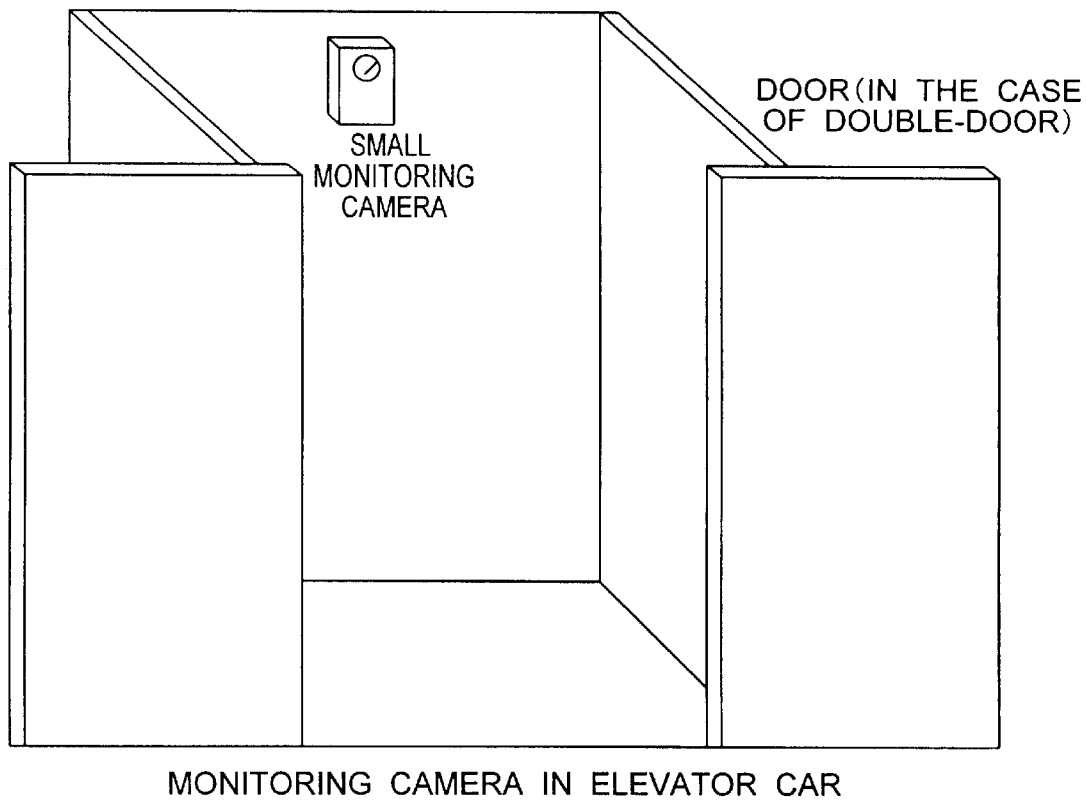
FIG. 16 schematically shows a monitoring camera installed in an elevator car.

Then, a density-based image of an object to be recognized is entered by the image acquiring means 301 in a step S404. The image acquiring means 301 is, for example, a monitoring camera installed in an elevator car as mentioned above, and the image acquiring means 301 is installed on a front wall with respective to a door as shown in FIG. 16 illustrating the prior art.

Subsequently, the density-based image, which has been entered by the image acquiring means 301, is subjected to edge detection implemented in the door defining area that has been set by the door highlighting means 311 (a step S405: a door highlighting step). A two-dimensional door area edge image 502 in which a door edge is highlighted is compressed into one-dimensional information in a direction of the door edge (a step S406). In this embodiment, the camera is installed on a front wall against the door; hence, the projection direction is vertical.

More specifically, referring to FIG. 5, the two-dimensional image 502 is added in a direction "j" and compressed into one-dimensional information 503. The one-dimensional information 503 provides information in which the door edge portion is highlighted as indicated by information 504.

Subsequently, the one-dimensional projection data is stored in time series by the data time series storing means 312 in a step S407 (a data time series storing step), and a two-dimensional image called a "time-and-space image" having a time axis and a space axis is generated. Referring to FIG. 5, as the one-dimensional information 504 is arranged in time series, a two-dimensional image 505 called the "time-and-space image" having the time axis and the space axis is produced. For example, if a door performs a series of operations consisting of "Open→Close→Open→Close," then a time-and-space image containing straight lines that correspond to door edges as indicated by an image 506 is generated.

The door operation extracting means 313 extracts elements, which correspond to opening/closing operations of the door, from the time-and-space image 506 in a step S408 (a door operation extracting step). In this case, the elements corresponding to the opening/closing operations of the door are straight lines 56a and 56b. In this embodiment, to extract the straight lines corresponding to the opening/closing operations of the door, magnitudes that individual pixels have in directions of the straight lines are added, and if the added value exceeds a preset threshold value, then it means a door opening/closing operation. In this embodiment, inclinations of the straight lines 56a and 56b are known in advance.

Next, the door open/closed state determining means 303 determines a door open/closed state, that is, whether the door is open, closed, or in the process of opening or closing in a step S409.

Thereafter, whether the door is closed is checked in a step S410, and if the door is open or in the process of opening or closing, then the procedure from the step S404 through the step S410 is repeated. If the door is closed, then a density-based image of an object to be recognized is entered by the image acquiring means 301 in a step S411.

In this embodiment, the presence of a passenger is determined according to the same method as that of the first embodiment set forth above. The passenger extracting means 304 obtains a difference between the input image and a background image, which has been entered beforehand, in a passenger defining area that has been defined (a step S412). The passenger presence determining means 305 determines whether there is a passenger or not in a step S413.

Subsequently, it is checked if a passenger is present in a step S414, and if there is no passenger, then the program returns to the step S404 to repeat the same procedure described above. If there is a passenger, then the integrating means 306 determines whether the door has been closed and whether a state wherein the passenger is present has lasted for a predetermined time (a step S415). The predetermined time is assumed to be, for example, about 40 to about 60 seconds used for current detection of a confinement.

More specifically, in the image monitoring apparatus according to this embodiment having the construction set forth above, if a result of the determination indicates that the door has been closed and the state wherein the passenger is present has lasted for the predetermined time, then it is determined that the passenger has been confined (a step S416), and an alarm is issued by the alarming means 307 before the procedure is terminated in a step S418.

The following provides a summary of the procedure implemented by the image monitoring apparatus according to this embodiment having the construction set forth above. An image is input by the image acquiring means 301; a door area is defined by the door area defining means 308; a position of a door edge in the door defining area is highlighted by the door highlighting means 311; data indicating door extracted by the door extracting means 311 is successively stored in time series at a predetermined cycle by the data time series storing means 312; door operation information is extracted from the time series data by the door operation extracting means 313; whether a candidate extracted by the door open/closed state determining means 303 has its door open, closed, or in the process of opening or closing is determined by the door open/closed state determining means 303; a passenger area is defined by the passenger area defining means 309; information regarding presence of a passenger is extracted from an image area defined by the passenger extracting means 304; presence of a passenger is determined based on the information extracted by the passenger presence determining means 305; information regarding a door open/closed state and a result of the passenger presence determination are combined by the integrating means 306; and an alarm is issued by the alarming means 307 based on a result of the combined information and determination.

Thus, the image monitoring apparatus according to the embodiment recognizes an open or closed door from a time-and-space image in a portion for recognizing an open/closed state of the door, while it recognizes a difference in a background in a portion for recognizing the presence of a passenger, thereby recognizing an open/closed state of the door and also the presence of a passenger. By combining the information regarding the door open/closed state and the information regarding the presence of a passenger, the image monitoring apparatus recognizes that the state wherein a passenger is present with the door closed has lasted for a predetermined time. The present invention makes it possible to detect a passenger confined in an elevator car just from an image acquired through a camera.

In this embodiment, a time-and-space image is generated for the door extracting means 302, and a timing of a door opening or closing operation is identified based on an intensity of an edge in a direction of a straight line corresponding to the door in order to extract a door opening/closing element from the time-and-space image. For example, however, a straight line corresponding to the door may be extracted from the time-and-space image by template matching, as an alternative.

Furthermore, there are alternative methods for determining the directions of the straight lines corresponding to the door in the step for extracting the door operation elements from the time-and-space image. For example, a time-and-space image is produced first, and the inclinations of the straight line directions are determined from the time-and-space image, so that the inclinations may be known beforehand. Alternatively, the inclinations may be calculated from a moving speed of an elevator car rather than directly determining the inclinations from a time-and-space image. Further alternatively, a means may be provided for automatically recognizing the inclinations from an image, obviating the need for manual setting.

Figure 6:
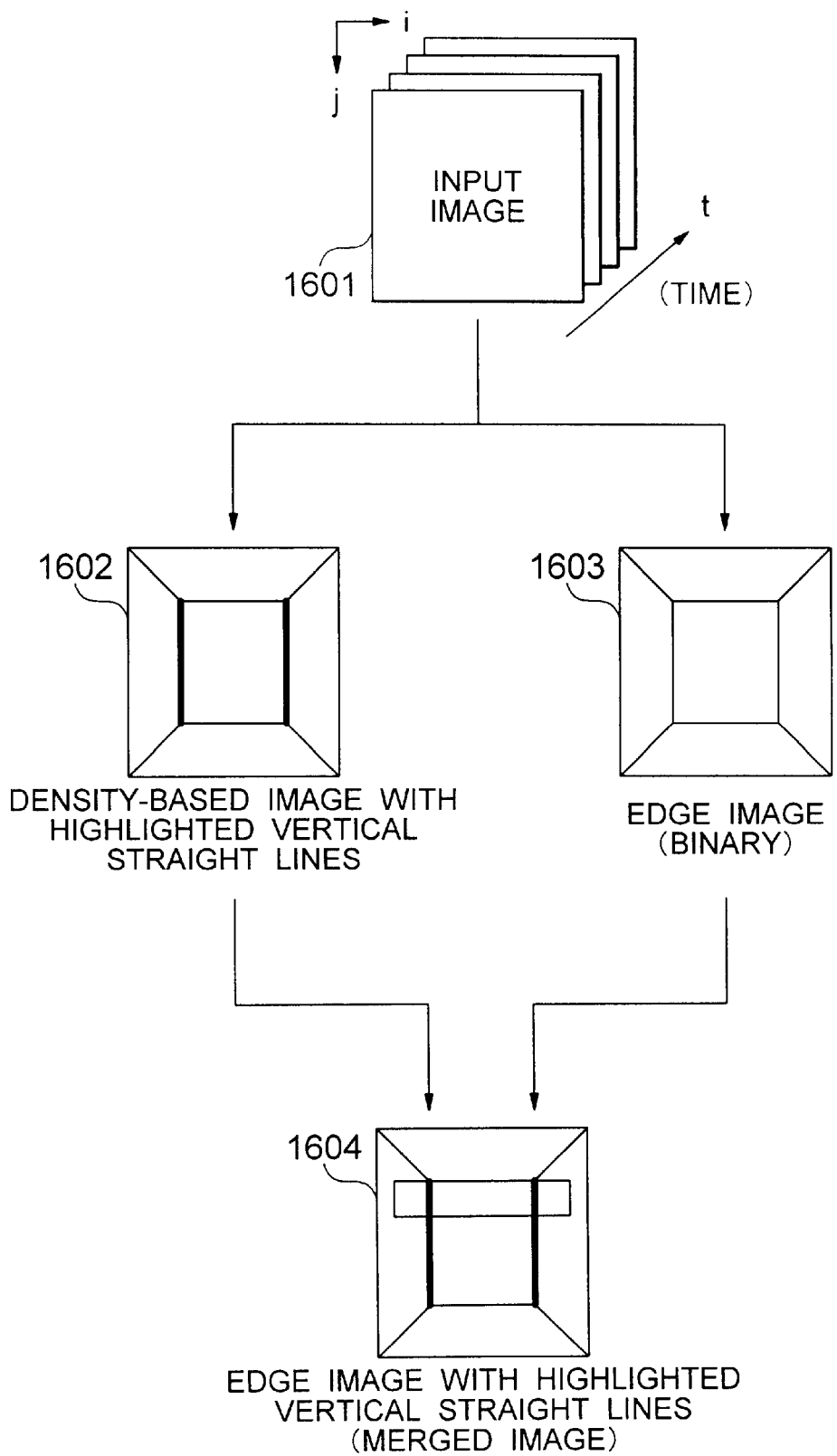
FIG. 6 is a diagram illustrating a method for detecting an edge from a density-based input image.

The edges are detected from the density-based input images by merging a binary edge image 1603 and a density-based vertical edge image 1602 corresponding to door edges so as to produce an edge image 1604 having highlighted vertical lines as shown in FIG. 6, then the merged image 1604 is subjected to the processing described above. This process improves the accuracy of extracting an operation of the door.

Furthermore, in this embodiment, the procedure terminates upon completion of the step wherein the alarming means issues an alarm. Alternatively, however, the alarm information may be transmitted to a control center or the like by a transmitting means. This arrangement enables further automation of a remote monitoring system.

Third Embodiment

Figure 7:
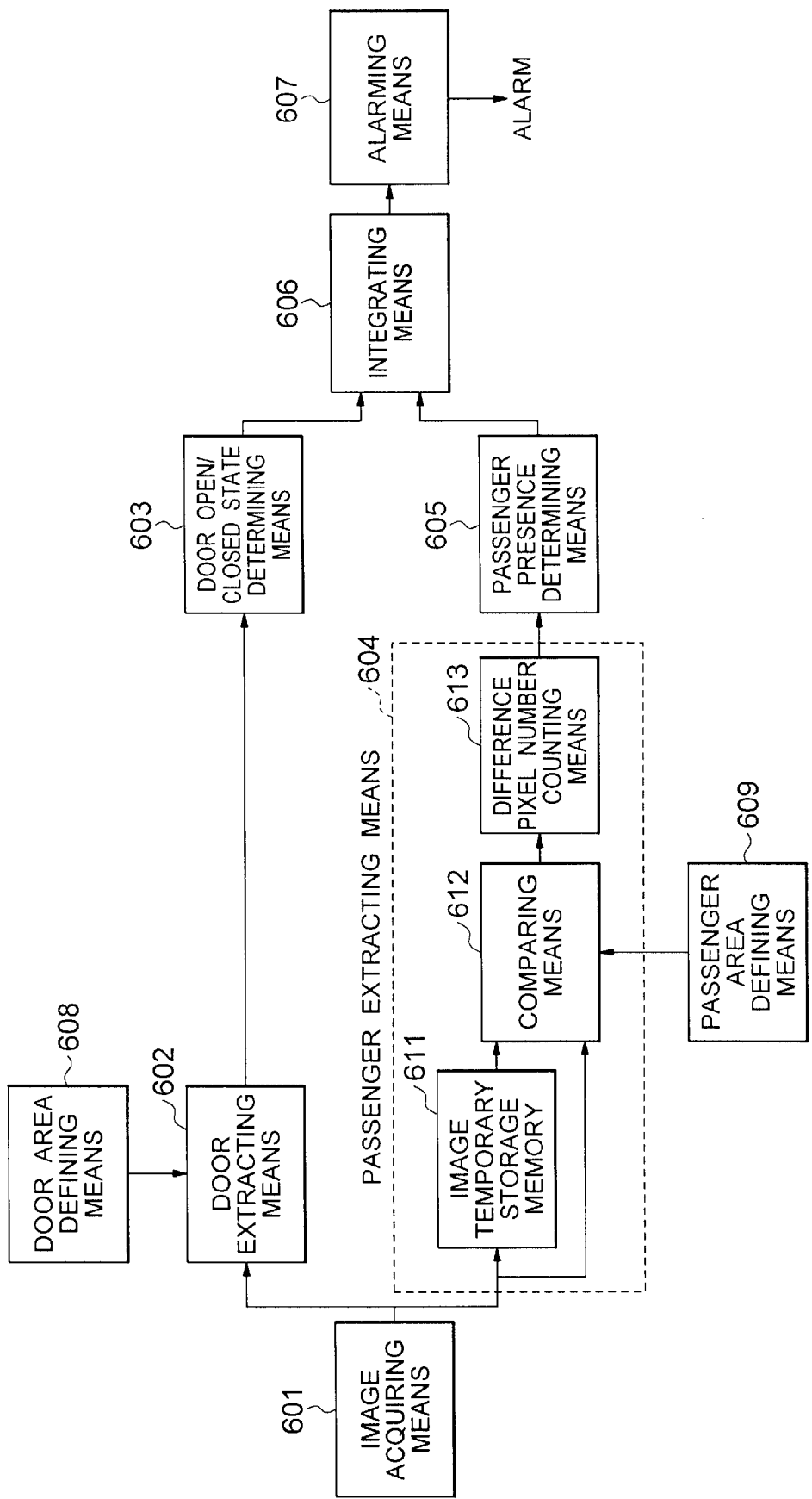
FIG. 7 is a block diagram showing yet another image monitoring apparatus in accordance with the present invention.
Figure 8:
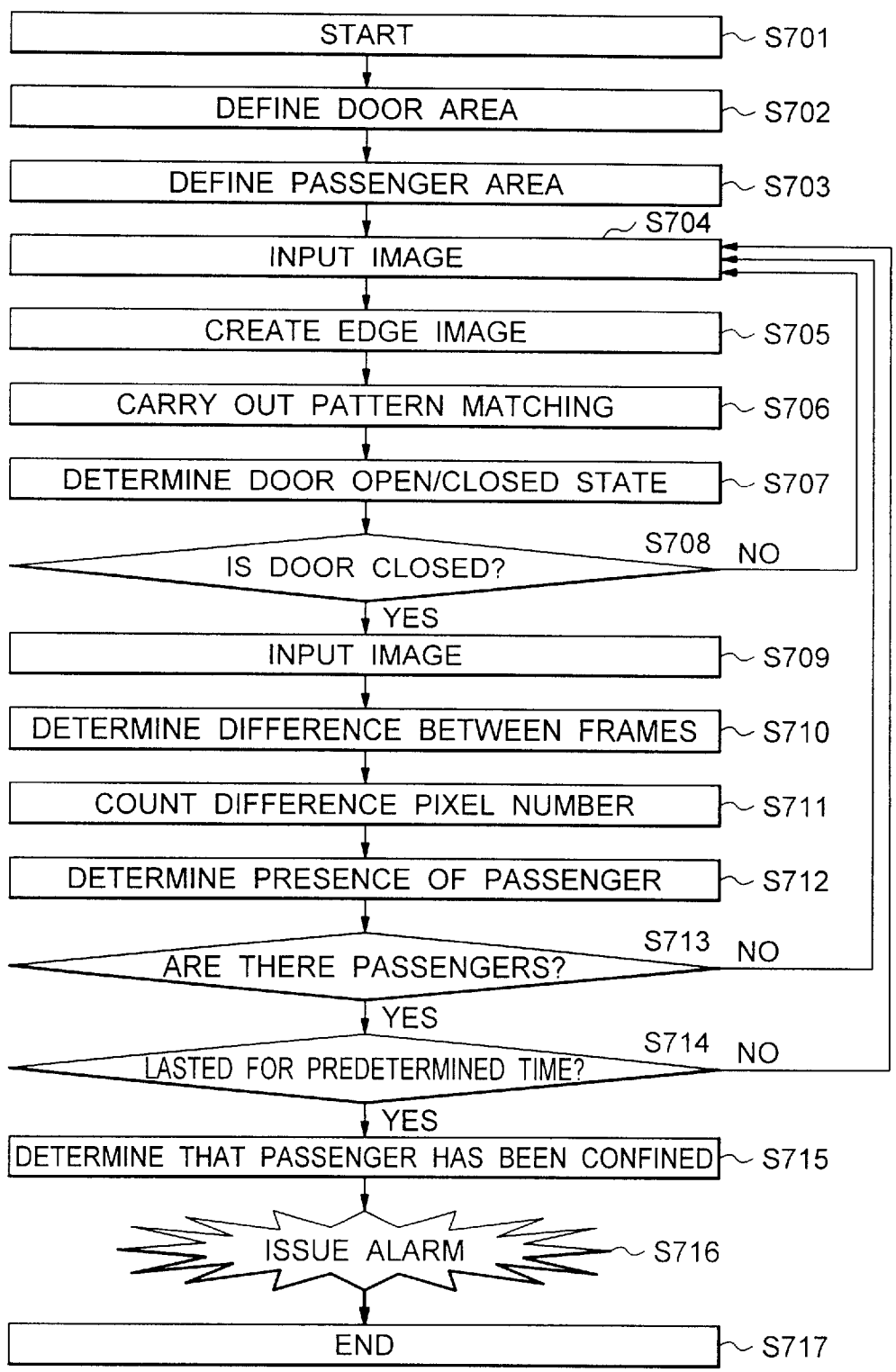
FIG. 8 is a flowchart illustrating an operation of the image monitoring apparatus.

FIG. 7 is a block diagram showing yet another image monitoring apparatus in accordance with the present invention, and FIG. 8 is a flowchart illustrating an operation of the image monitoring apparatus.

Referring to FIG. 7, the image monitoring apparatus includes: an image acquiring means 601 for entering an image; a door area defining means 608 for defining a door area; a door extracting means 602 for extracting information regarding a door operation from an image area; a door open/closed state determining means 603 for determining whether an extracted candidate has its door open, closed, or in the process of opening or closing; a passenger area defining means 609 for defining a passenger area; a passenger extracting means 604 for extracting information regarding presence of a passenger from a defined image area; a passenger presence determining means 605 for determining presence of a passenger based on the extracted information; an integrating means 606 for combining the information regarding a door open/closed state and the information regarding the presence of a passenger; and an alarming means 607 for issuing an alarm based on a result of combining the above information provided by the integrating means 606.

The passenger extracting means 604 in this embodiment includes an image temporary storage memory 611 for temporarily saving an image, a comparing means 612 for comparing a saved image and a current image of a defined image area, and a difference pixel number counting means 613 for counting a number of difference pixels based on a comparison result.

As in the case of the first embodiment, the image acquiring means 601 is, for example, a monitoring camera installed in an elevator car. In this embodiment, a confined passenger is detected using a picture obtained by the monitoring camera.

The following will describe an operation of the image monitoring apparatus in conjunction with the flowchart shown in FIG. 7. When the monitor is started, initialization is carried out first in a step S701. Then, a door area is defined by the door area defining means 608 in a step S702, and a passenger area is defined by the passenger area defining means 609 in a step S703.

Then, a density-based image of an object to be recognized is entered by the image acquiring means 601 in a step S704. The image acquiring means 601 is, for example, a monitoring camera installed in an elevator car as mentioned above, and the image acquiring means 601 is installed on a front wall against a door. The image acquiring means 601 acquires images in succession at a predetermined timing, e.g., 30 images or 30 frames per second.

Subsequently, the density-based image, which has been entered by the image acquiring means 601, is subjected to edge detection in a step S705. Based on the edge information, template matching is carried out to detect vertical straight lines of door edges to extract a door candidate (a step S706). The operations in the steps S705 and S706 are performed by the door extracting means 602.

Thereafter, based on an output of the door extracting means 602, the door open/closed state determining means 603 determines a door open/closed state, that is, whether the door is open, closed, or in the process of opening or closing (a step S707).

Next, whether the door is closed is checked in a step S708, and if the door is open or in the process of opening or closing, then the procedure from the step S704 through the step S708 is repeated. If the door is closed, then a density-based image of an object to be recognized is entered by the image acquiring means 601 in a step S709.

Then, the image temporary storage memory 611 and the comparing means 612 determine a difference between a stored image that is one frame before and a newly input image (a step S710: a temporary image saving step combined with a comparing step). The difference pixel number counting means 613 counts a number of moved pixels in a step S711 (a difference pixel number counting step). Furthermore, the passenger presence determining means 605 determines whether there is a passenger or not in a step S712. At this time, it is determined that a passenger is present if a counted number of pixels exceeds a predetermined threshold value.

Subsequently, it is checked if a passenger is present in a step S713, and if there is no passenger, then the program returns to the step S704 to repeat the same procedure described above. If there is a passenger, then the integrating means 606 determines whether the door has been closed and whether a state wherein the passenger is present has lasted for a predetermined time (a step S714). The predetermined time is assumed to be, for example, about 40 to about 60 seconds used for current detection of a confinement.

If the door is closed and the state wherein the passenger is present has lasted for the predetermined time, then it is determined that the passenger has been confined (a step S715), and the alarming means 607 issues an alarm in a step S716 before terminating the procedure in a step S717.

The following provides a summary of the procedure implemented by the image monitoring apparatus according to this embodiment having the construction set forth above. An image is input by the image acquiring means 601; a door area is defined by the door area defining means 608; door operation information is extracted from the image area defined by the door extracting means 602; whether a candidate extracted by the door open/closed state determining means 603 has its door open, closed, or in the process of opening or closing is determined by the door open/closed state determining means 603; the image is temporarily saved by the image temporary saving memory 611; a passenger area is defined by the passenger area defining means 609; a saved image and a current image in a defined image area are compared by the comparing means 612; the number of difference pixels is counted based on a comparison result by the difference pixel number counting means 613; presence of a passenger is determined based on the count number supplied by the passenger presence determining means 605; information regarding a door open/closed state and a result of the passenger presence determination are combined by the integrating means 606; and an alarm is issued by the alarming means 607 based on a result of the combined information and determination provided by the integrating means 606.

Thus, the image monitoring apparatus according to the embodiment determines whether a door is open or closed by performing the template matching on a portion for recognizing an open or closed door, and determines the presence of a passenger by determining a difference between an image of a preceding frame and an image of a current frame on a portion for recognizing the presence of a passenger. By combining the information regarding the door open/closed state and the information regarding the presence of a passenger, the image monitoring apparatus recognizes that the state wherein a passenger is present with the door closed has lasted for a predetermined time. The present invention makes it possible to detect a passenger confined in an elevator car just from an image acquired through a camera.

In this embodiment, the template matching based on an edge image has been used for the door extracting means. As an alternative, however, standard density-based image template matching, template matching based on a binary image produced by binarizing a density-based image, or a method for extracting a parametric pattern based on Hough transform or the like from an edge detection result may be used to obtain a characteristic pattern of a door edge for obtaining a candidate.

In this embodiment, the difference between image frames is determined over the entire passenger defining area. Alternatively, however, since the procedure counts the number of pixels of the difference rather than depending on positions of pixels, sampling process may be implemented rather than checking the entire area, thereby permitting processing cost to be saved.

Furthermore, the procedure has been terminated upon the issuance of an alarm by the alarming means; however, the information may be further transmitted to a control center or the like by a transmitting means. This enables a further automated remote monitoring system to be accomplished.

Fourth Embodiment

Figure 9:
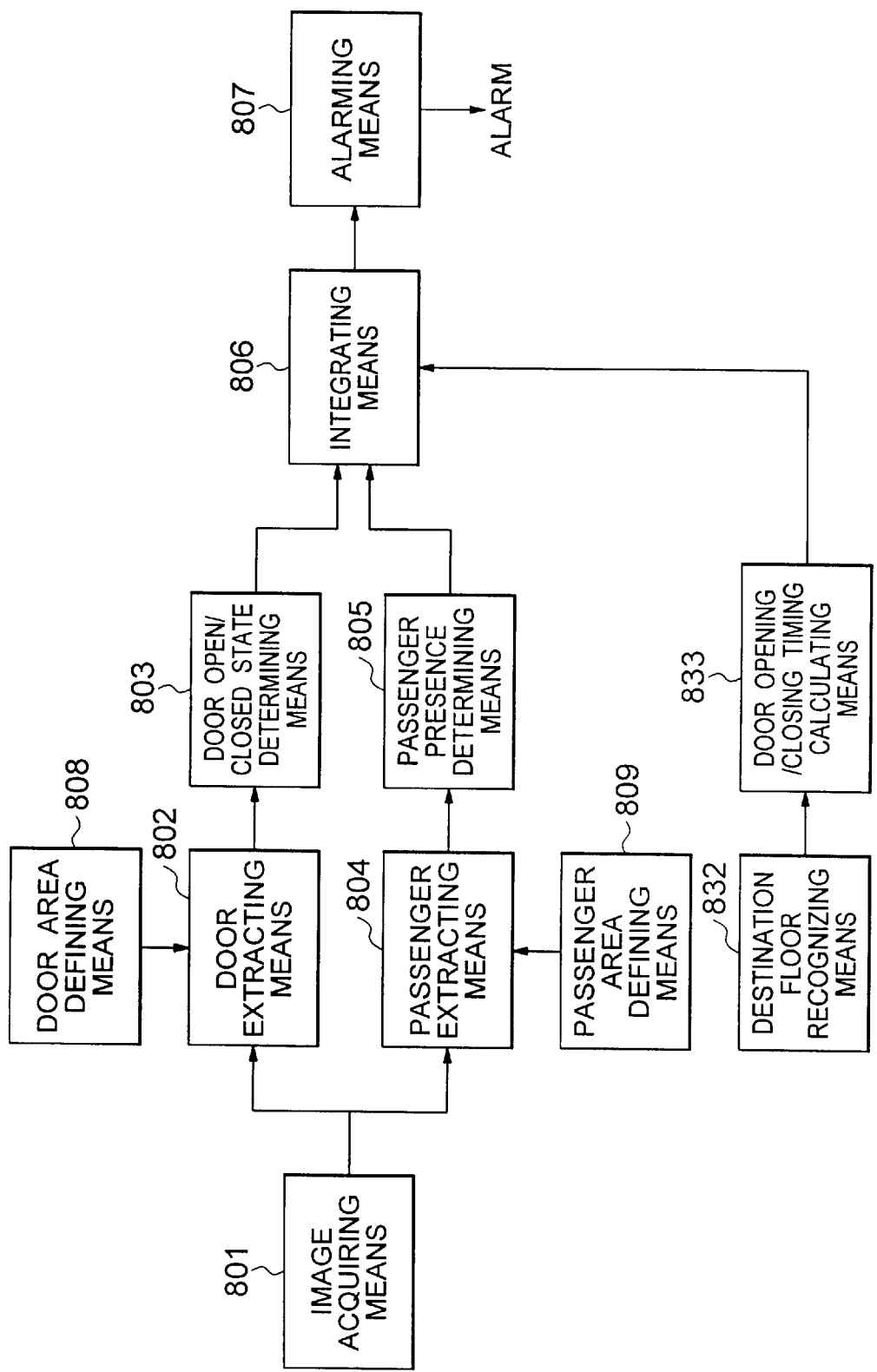
FIG. 9 is a block diagram showing still another image monitoring apparatus in accordance with the present invention.
Figure 10:
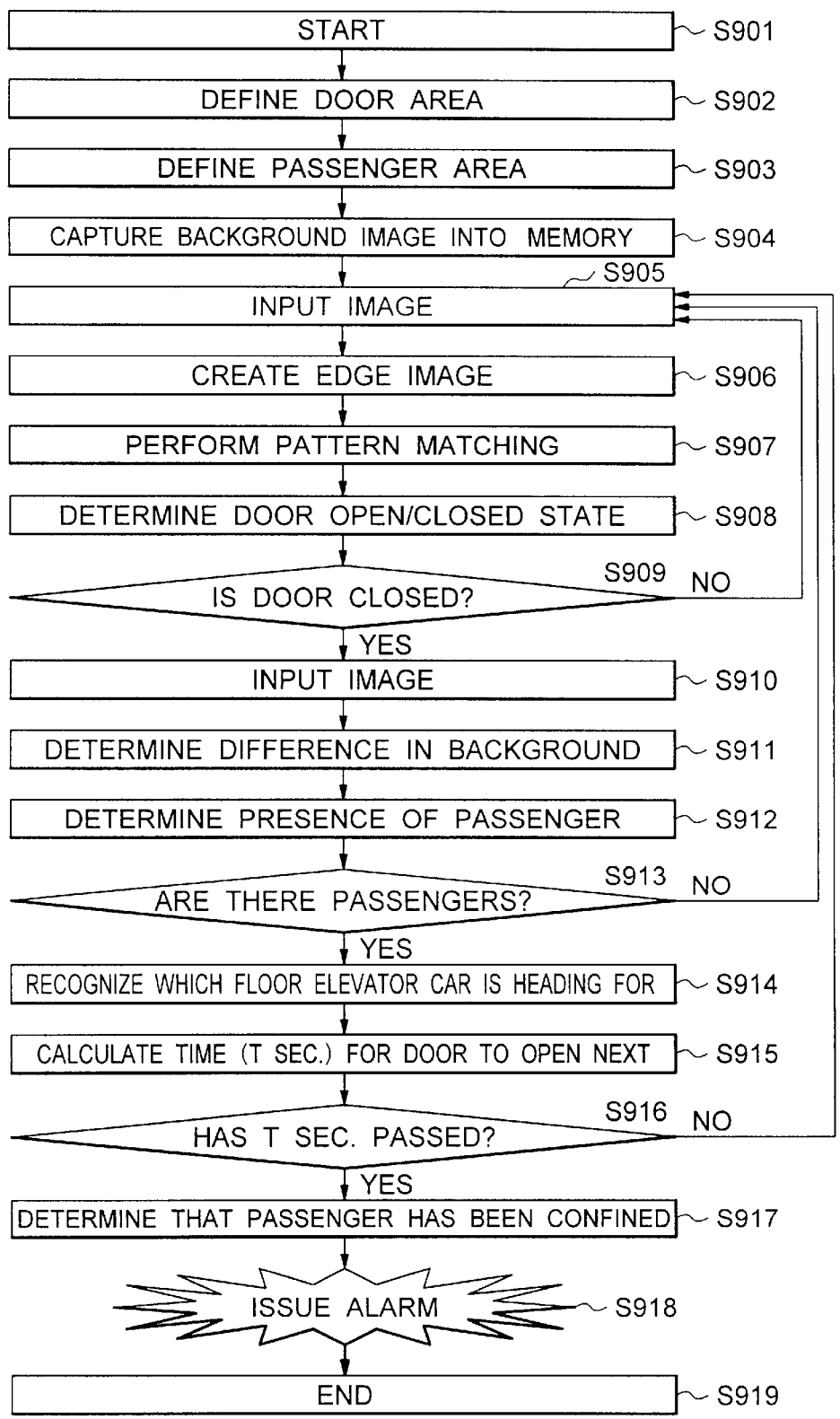
FIG. 10 is a flowchart illustrating an operation of the image monitoring apparatus.

FIG. 9 is a block diagram showing a further image monitoring apparatus in accordance with the present invention, and FIG. 10 is a flowchart illustrating an operation of the image monitoring apparatus.

Referring to FIG. 9, the image monitoring apparatus includes: an image acquiring means 801 for entering an image; a door area defining means 808 for defining an area of a door; a door extracting means 802 for extracting door operation information from an image area; a door open/closed state determining means 803 for determining whether an extracted candidate has its door opened, closed, or in the process of opening or closing; a passenger area defining means 809 for defining an area of passengers; a passenger extracting means 804 for extracting information regarding presence of a passenger from the defined image area; a passenger presence determining means 805 for determining presence of a passenger from the extracted information; an integrating means 806 for combining determination results of the door open/closed state and the presence of a passenger; an alarming means 807 for issuing an alarm based on a combined determination result supplied by the integrating means 806; a destination floor recognizing means 832 for recognizing a destination floor specified by a passenger; and a door opening/closing timing calculating means 833 for calculating a timing for opening or closing the door.

As in the case of the first embodiment, the image acquiring means 801 is, for instance, a monitoring camera installed in an elevator car. In this embodiment, pictures from the monitoring camera will be used to detect a confined passenger.

An operation of the image monitoring apparatus will be described in conjunction with the flowchart of FIG. 10. When the monitor is started, initialization is carried out first in a step S901, then an area of a door is defined by the door area defining means 808 in a step S902. Furthermore, an area of passengers is defined by the passenger area defining means 809 in a step S903. In this embodiment, a difference in a background is identified to recognize presence of a passenger; therefore, a background image is captured beforehand in a memory in a step S904.

Then, a density-based image of an object to be recognized is entered by the image acquiring means 801 in a step S905. Subsequently, in a step S906, the density-based image, which has been entered by the image acquiring means 801, is subjected to edge detection. Based on the edge information, a vertical linear portion of a door edge is detected by template matching, and a door candidate is extracted in a step S907. The operations in the steps S906 and S907 are performed by the door extracting means 802.

Thereafter, based on an output of the door extracting means 802, the door open/closed state determining means 803 determines in a step S908 whether the door is open, closed, or in the process of opening or closing.

Subsequently, whether the door is closed or not is checked in a step S909, and if the door is open or in the process of opening or closing, then the operations of steps S905 through S909 are repeated. If the door is closed, then the density-based image of the object to be recognized, which has been obtained by the image acquiring means 801, is input in a step S910. On the defined passenger defining area, a difference between the input image and a background image, which has been input in advance, is obtained by the passenger extracting means 804 in a step S911. Then, presence of a passenger is determined by a passenger presence determining means 805 in a step S912.

In a step S913, whether a passenger is present or not is determined, and if no passenger is present, then the program returns to the step S905 to repeat the aforesaid procedure. The operation up to this point is identical to that shown in FIG. 2 in the first embodiment.

If a passenger is present, then the destination floor recognizing means 832 recognizes which floor an elevator car is heading for (a step S914: a destination floor recognizing step). In addition, the door opening/closing timing calculating means 833 calculates time (T seconds) at which the door opens next (a step S915: a door opening/closing timing calculating step).

Based on the above result, the integrating means 806 determines if a passenger has been confined or not. If the door is closed and the state wherein the passenger is present has lasted for T seconds (a step S916), then it is determined that the passenger has been confined (a step S917). The alarming means 807 issues an alarm (step S918) before the procedure is terminated (step S919).

The following provides a summary of the procedure implemented by the image monitoring apparatus according to this embodiment having the construction described above. An image is input by the image acquiring means 801; a door area is defined by the door area defining means 808; door operation information is extracted from a defined image area by the door extracting means 802; whether a candidate extracted by the door open/closed state determining means 803 has its door open, closed, or in the process of opening or closing is determined by the door open/closed state determining means 803; a passenger area is defined by the passenger area defining means 809; information regarding presence of a passenger is extracted from an image area defined by the passenger extracting means 804; presence of a passenger is determined based on the information extracted by the passenger presence determining means 805; a destination floor specified by a passenger is recognized by the destination floor recognizing means 832; time required for a closed door to open is calculated by the door opening/closing timing calculating means 833; information regarding a door open/closed state, a result of the passenger presence determination, and the calculated door opening/closing timing are combined by the integrating means 806; and an alarm is issued by the alarming means 807 based on a result of the combined information supplied by the integrating means 806.

Thus, for the portion for recognizing an open/closed state of a door and on a portion for recognizing the presence of a passenger, the image monitoring apparatus according to this embodiment performs the same operation as that shown in FIG. 2 in the first embodiment. However, while the predetermined time has been handled as a known value in FIGS. 2, 4, and 7 in the first, second, and third embodiments, this embodiment according to the present invention is characterized by the provision of the means for calculating the predetermined time, namely, the destination floor recognizing means 832 and the door opening/closing timing calculating means 833.

The destination floor recognizing means 832 for recognizing which floor an elevator car is heading for may obtain the information from an elevator controller or may automatically recognize the destination floor by carrying out image processing.

Furthermore, the procedure has been terminated upon the issuance of an alarm by the alarming means; however, the information may be further transmitted to a control center or the like by a transmitting means as in the embodiments set forth above. In this embodiment according to the present invention, the time before an alarm is issued can be set to different values to meet diverse situations rather than fixing the time, thus enabling an improved automated remote monitoring system to be accomplished.

Fifth Embodiment

Figure 11:
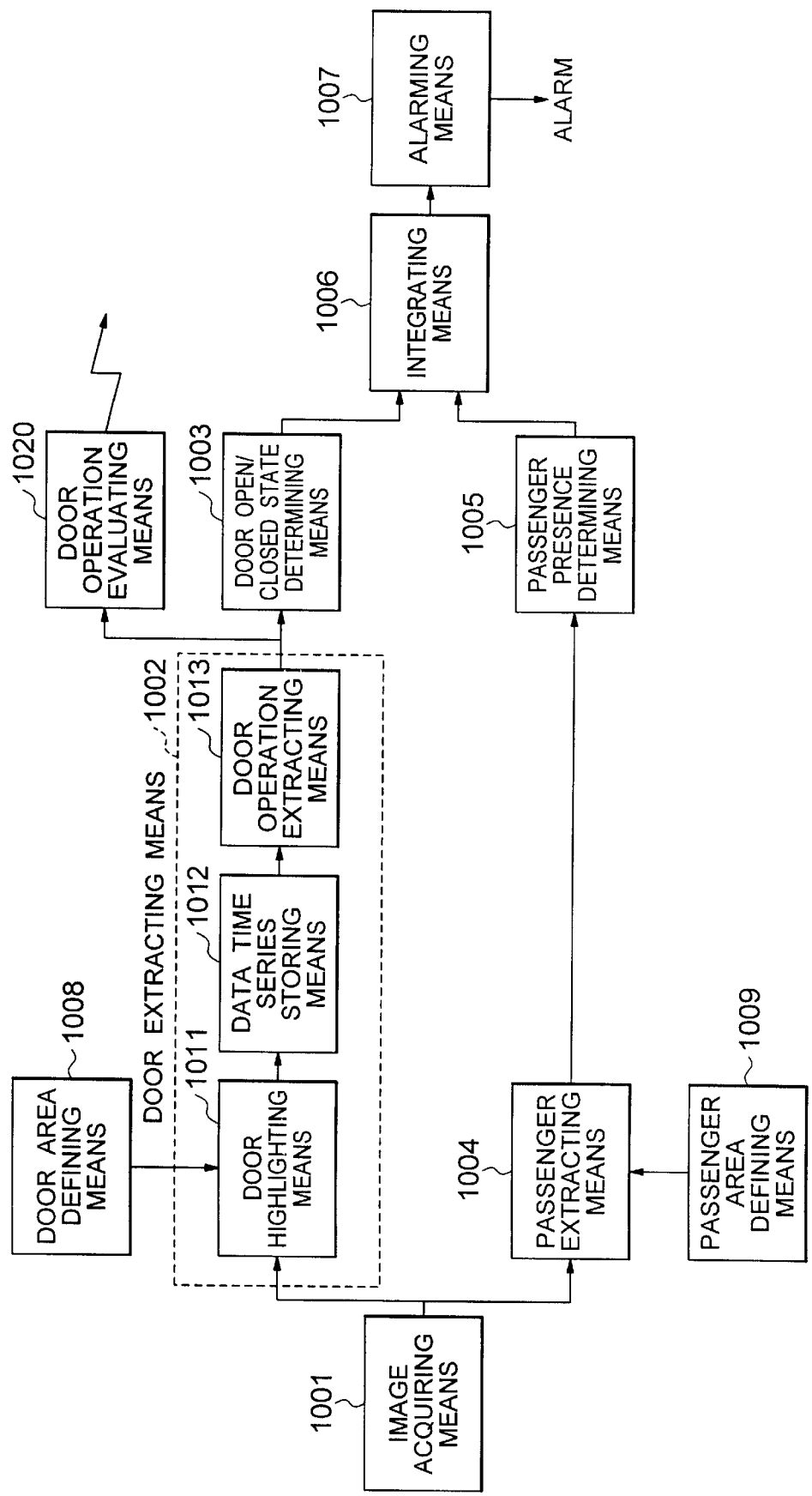
FIG. 11 is a block diagram showing a further image monitoring apparatus in accordance with the present invention.
Figure 12:
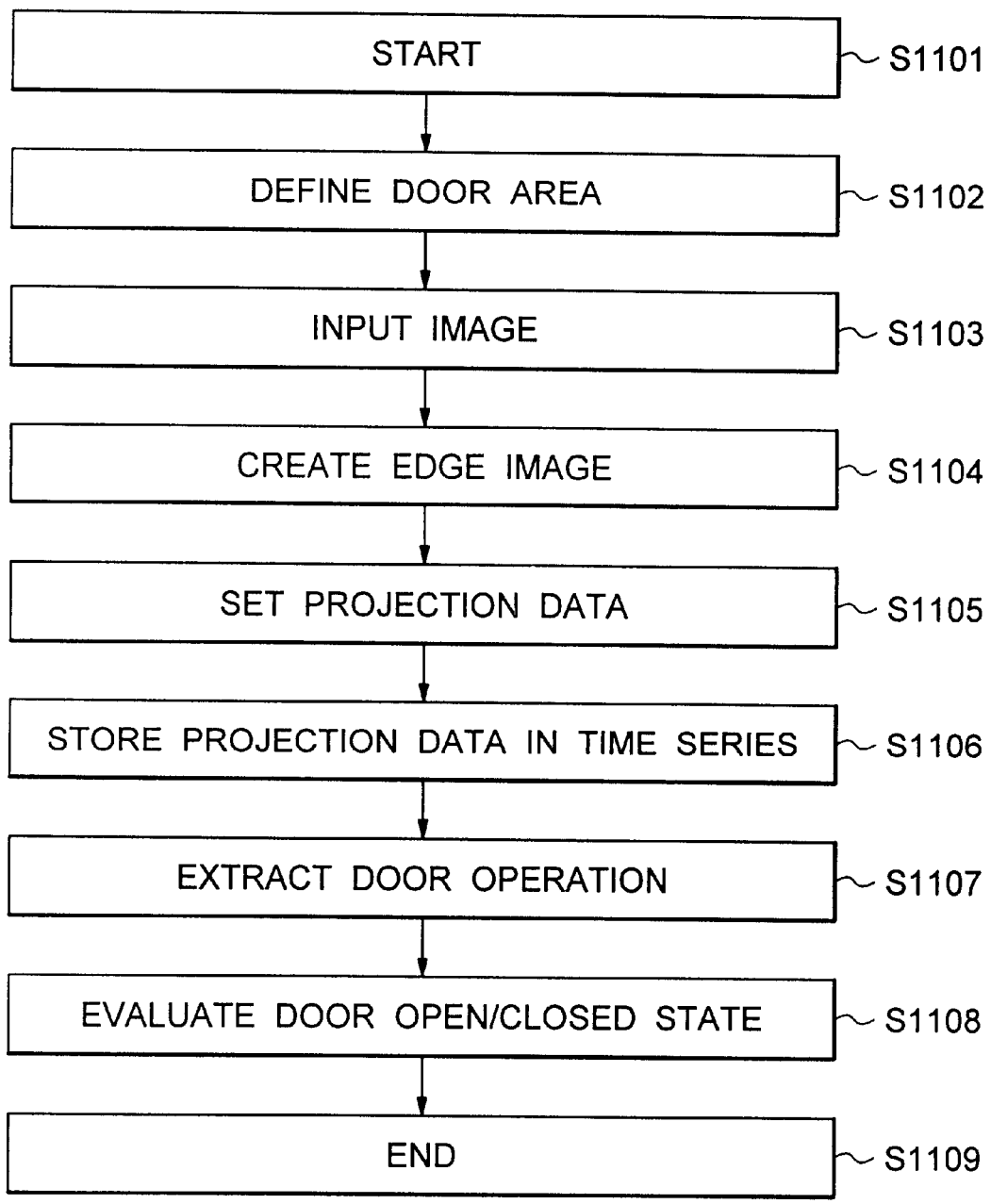
FIG. 12 is a flowchart illustrating an operation of the image monitoring apparatus.
Figure 13:
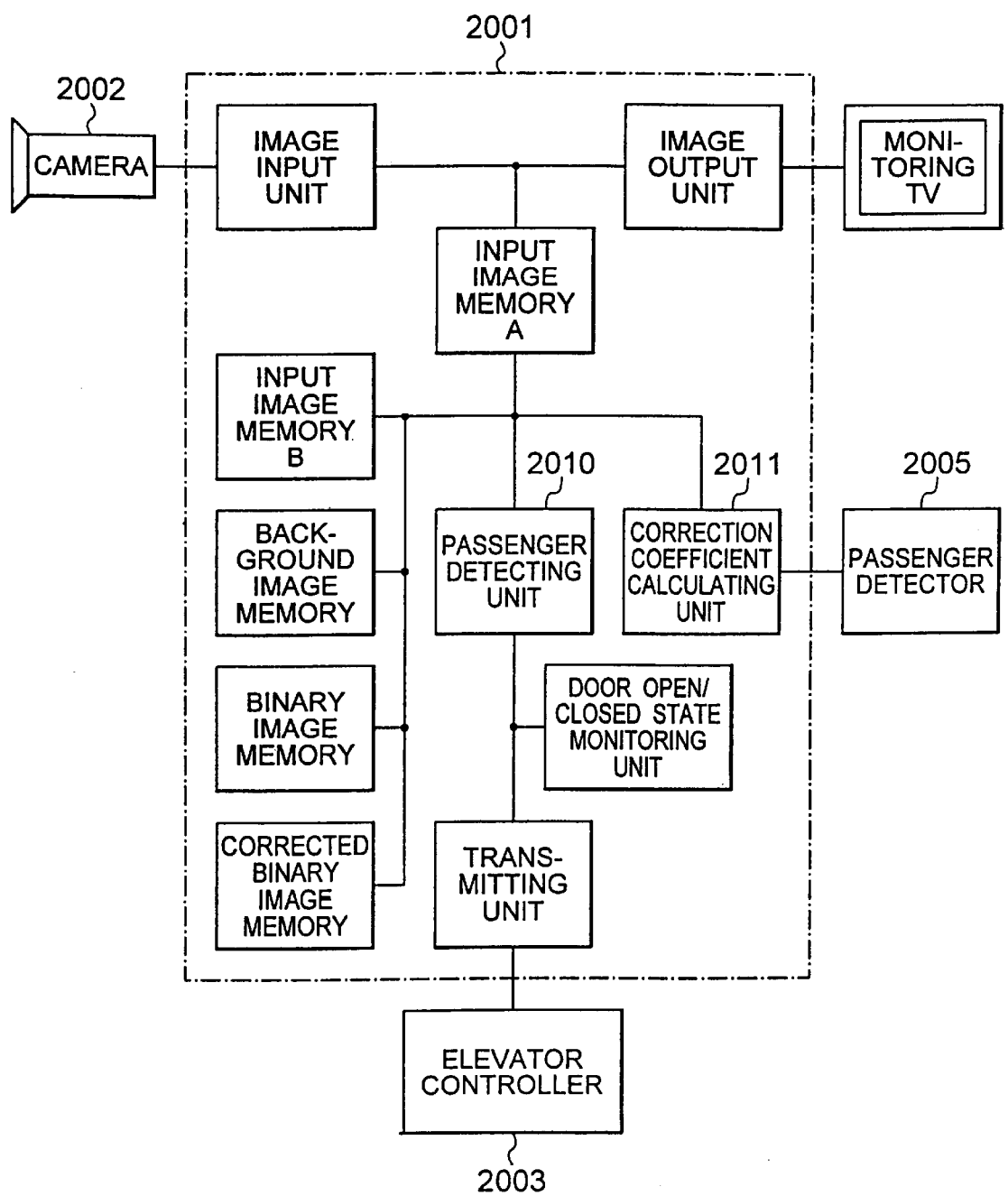
FIG. 13 is a block diagram illustrating an outline of a conventional monitoring technology.
Figure 14:
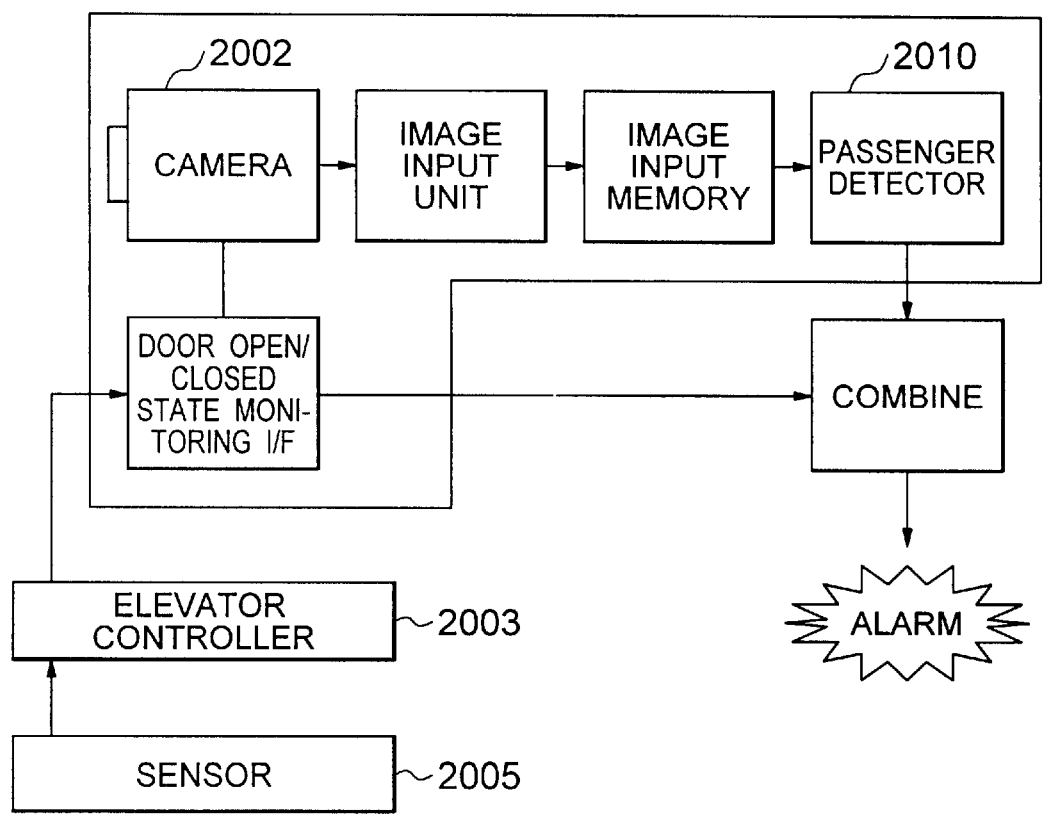
FIG. 14 is a schematic diagram of the conventional technology of FIG. 13.
Figure 15:
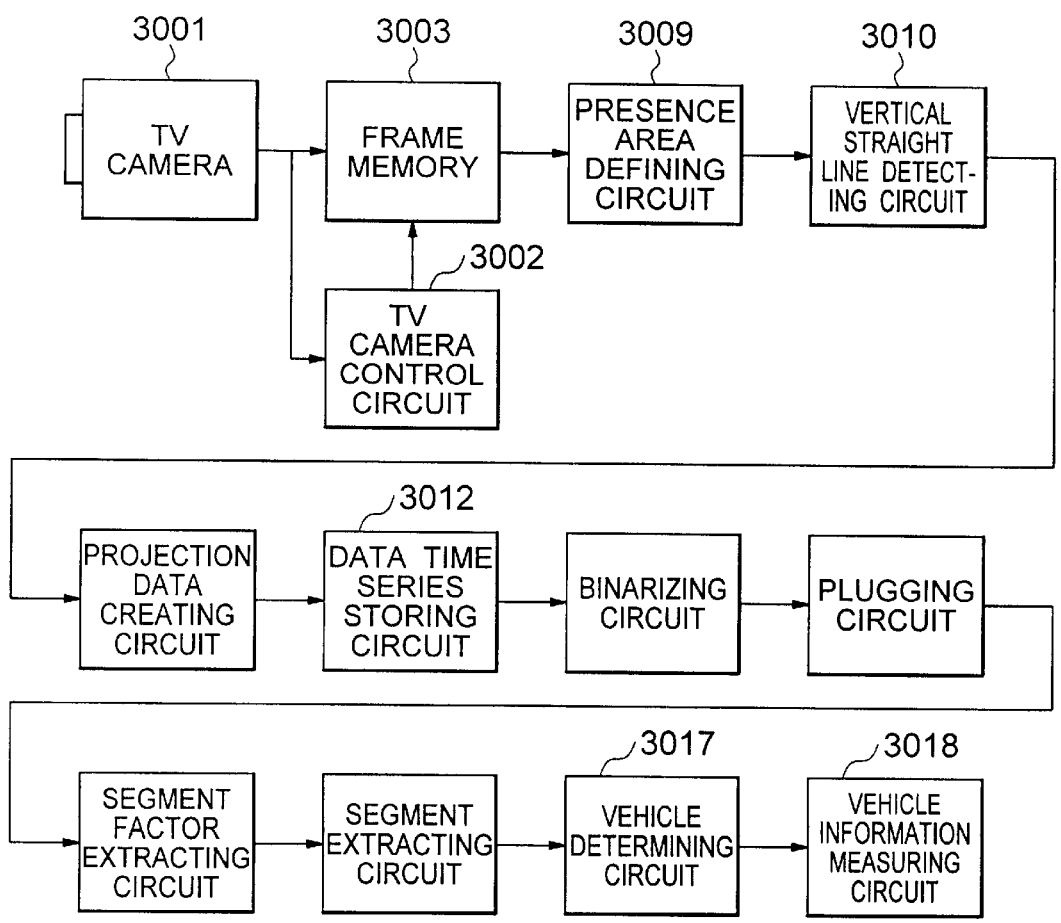
FIG. 15 is a block diagram illustrating an outline of another conventional monitoring technology.

FIG. 11 is a block diagram showing a further image monitoring apparatus in accordance with the present invention, and FIG. 12 is a flowchart illustrating an operation of the image monitoring apparatus.

Referring to FIG. 11, the image monitoring apparatus includes: an image acquiring means 1001 for entering an image; a door area defining means 1008 for defining a door area; a door extracting means 1002 for extracting information regarding a door operation from an image area; a door open/closed state determining means 1003 for determining whether an extracted candidate has its door open, closed, or in the process of opening or closing; a passenger area defining means 1009 for defining a passenger area; a passenger extracting means 1004 for extracting information regarding presence of a passenger from a defined image area; a passenger presence determining means 1005 for determining presence of a passenger based on the extracted information; an integrating means 1006 for combining the information regarding a door open/closed state and the information regarding the presence of a passenger; an alarming means 1007 for issuing an alarm based on a result of combining the above information provided by the integrating means 1006; and a door operation evaluating means 1020 for detecting an open or closed state of the door and sending a result of the detection to an external unit (not shown).

The door extracting means 1002 has: a door highlighting means 1011 for highlighting a position of an edge of a door in the door defining area; a data time series storing means 1012 for successively storing in time series door edge position data emphasizing the position of the edge of the door; and a door operation extracting means 1013 for extracting an opening/closing operation of the door from the time series data.

As in the case of the first embodiment, the image acquiring means 1001 is, for example, a monitoring camera installed in an elevator car. In this embodiment, a confined passenger is detected using a picture obtained by the monitoring camera.

Regarding the detection of a confined passenger, this embodiment performs the same procedure as that in the second embodiment discussed above, so that the description will not be repeated. A procedure for detecting a door opening or closing failure will be described. FIG. 12 shows a flowchart indicating a flow of an operation performed by this image monitoring apparatus for detecting a door opening or closing failure. The following will describe the operation of the image monitoring apparatus in conjunction with the flowchart.

When the monitor is started, initialization is carried out first in a step S1101. Then, a door area is defined by the door area defining means 1008 in a step S1102.

Then, a density-based image of an object to be recognized is entered by the image acquiring means 1001 in a step S1103. Subsequently, the density-based image, which has been entered by the image acquiring means 1001, is subjected to edge detection implemented in the door defining area that has been defined by the door highlighting means 1011 (a step S1104). A two-dimensional door area edge image is compressed into one-dimensional information in a direction of the door edge (a step S1105).

In this embodiment, the camera is installed on a front wall against the door; hence, the projection direction is vertical. The one-dimensional projection data is stored in time series by the data time series storing means 1012 in a step S1106 so as to produce a two-dimensional image called a "time-and-space image" having a time axis and a space axis. The door operation extracting means 1013 extracts elements, which correspond to opening/closing operations of the door, from the time-and-space image in a step S1107. The door operation evaluating means 1020 evaluates an open/closed state of the door, that is, whether the door is fully closed or fully open, then a result of the evaluation is sent to an external unit, not shown, (a step S1108: a door operation evaluating step) before the procedure is terminated in a step S1109.

The following provides a summary of the procedure implemented by the image monitoring apparatus according to this embodiment having the construction set forth above. An image is input by the image acquiring means 1001; a door area is defined by the door area defining means 1008; a position of a door edge in the door defining area is highlighted by the door highlighting means 1011; data indicating door extracted by the door extracting means 1011 is successively stored in time series at a predetermined cycle by the data time series storing means 1012; door operation information is extracted from the time series data by the door operation extracting means 1013; whether a candidate extracted by the door open/closed state determining means 1003 has its door open, closed, or in the process of opening or closing is determined by the door open/closed state determining means 1003; an open or closed state of the door, i.e., whether the door is fully closed or fully open, is evaluated by the door operation evaluating means 1020, and a result of the evaluation is sent to an external unit (not shown); a passenger area is defined by the passenger area defining means 1009; information regarding presence of a passenger is extracted from an image area defined by the passenger extracting means 1004; presence of a passenger is determined based on the information extracted by the passenger presence determining means 1005; information regarding a door open/closed state and a result of the passenger presence determination are combined by the integrating means 1006; and an alarm is issued by the alarming means 1007 based on a result of the combined information and determination supplied by the integrating means 1006.

Thus, the image monitoring apparatus according to the embodiment not only detects a confined passenger by combining a result of the recognition of a door open/closed state and a result of the recognition of the presence of a passenger, but also recognizes a current state of the door, namely, whether the door is closed, open, or in the process of closing or opening in the portion for recognizing a door operation state. This arrangement allows a door opening or closing failure to be detected just from a picture supplied by the camera, obviating the need for employing a dedicated sensor. In other words, installing the image monitoring apparatus according to this embodiment makes it possible to obviate the need for a dedicated sensor provided in the past for detecting a door opening or closing failure.

Moreover, as mentioned above, a current state of a door, namely, whether the door is closed, open, or in the process of closing or opening, can be recognized in the portion for recognizing a door operation state. Therefore, an abnormal operation such as frequent repetition of opening and closing can be detected in addition to the detection of a door opening or closing failure.

Furthermore, in this embodiment, straight lines corresponding to the opening and closing of the door (open: 56a; closed: 56b) are extracted from the time-and-space image 506 (shown in FIG. 5) consisting of the time axis and the space axis in order to recognize an open or closed state of the door. If a passenger or a substance should be caught in the door during opening or closing of the door, then linearity of the straight lines is destroyed, making it possible to detect such an abnormal situation wherein the passenger or the substance is caught in the door, just from an image. This obviates the need for installing a dedicated sensor.

In the first through fifth embodiments, it is assumed that a passenger is confined in an elevator car. Applications of the image monitoring apparatus in accordance with the present invention, however, are not limited to elevator cars. The present invention can be applied for monitoring closed passenger spaces that have opening/closing doors.

As described above, the image monitoring apparatus in accordance with one aspect of the present invention is an apparatus for monitoring an interior of a closed space that has an opening/closing door, including: image acquiring means provided in the space so that it faces the door to acquire an image of an interior of the space including the door; door area defining means for setting a predetermined door defining area for the image; door extracting means for extracting a door image from the door defining area of the image; door open/closed state determining means for determining whether the door is open or closed based on an output of the door extracting means; passenger area defining means for setting a predetermined passenger defining area for the image; passenger extracting means for extracting a passenger image from the passenger defining area of the image; passenger presence determining means for determining whether a passenger is present or not based on an output of the passenger extracting means; integrating means for determining whether a passenger is confined or not by integrating judgements of the door open/closed state determining means and the passenger presence determining means; and alarming means for issuing an alarm to outside if a passenger has been confined, based on an output of the integrating means. With this arrangement, a confined passenger in the closed space can be detected just from an image acquired by the image acquiring means, without the need for providing a dedicated sensor.

The door extracting means has: door highlighting means for highlighting a position of an edge of a door in the door defining area; data time series storing means for successively storing in time series door edge position data emphasizing the position of the edge of the door; and door operation extracting means for extracting an opening/closing operation of the door from the time series data. The door open/closed state determining means determines whether the door is open or closed based on an output of the door operation extracting means. With this arrangement, accuracy of determination of a door open or closed state is improved, leading to higher reliability of detection of a confined passenger.

The passenger extracting means has: an image temporary storage memory for temporarily saving a previous image; comparing means for performing comparison between an image in the temporary storage memory and an image acquired by the image acquiring means; and difference pixel number counting means for counting a number of pixels of a difference between the two images based on an output of the comparing means. The passenger presence determining means determines whether there is a passenger or not based on an output of the difference pixel number counting means. This arrangement improves accuracy in determining whether a passenger is present or not, leading to even higher reliability of detection of a confined passenger.

The image monitoring apparatus further includes destination floor recognizing means for recognizing a destination floor, and door operation timing calculating means for calculating a time before the door is opened next based on an output of the destination floor recognizing means. The integrating means determines that a passenger has been confined based on determinations of the door open/closed state determining means and the passenger presence determining means and if the door is not opened when the time is reached. This arrangement further improves accuracy in determining whether there is a confined passenger or not, leading to higher reliability of the image monitoring apparatus.

The image monitoring apparatus according to another aspect of the present invention is an apparatus for monitoring an opening/closing door, including: image acquiring means provided so that it faces the door to acquire an image including the door; door area defining means for setting a predetermined door defining area for the image; door extracting means for extracting a door image from the door defining area of the image; and door operation evaluating means for detecting whether the door is open or closed based on an output of the door extracting means and outputting a detection signal to an external device. With this arrangement, a door opening or closing failure can be detected from an image acquired by the image acquiring means, making it possible to obviate the need for a dedicated sensor provided in the past to detect a door opening/closing failure.

The alarming means is provided remotely from the image acquiring means, so that monitoring for a confined passenger can be accomplished from a distance.

The image monitoring method according to yet another aspect of the present invention is a method for monitoring an interior of a closed space having an opening/closing door, including: an image acquiring step for acquiring an image of an interior of the space including the door by an image capturing device provided in the space so that it faces the door; a door area setting step for setting a predetermined door defining area for the image; a door extracting step for extracting a door image from the door defining area of the image; a door open/closed state determining step for determining whether the door is open or closed based on an output of the door extracting step; a passenger area setting step for setting a predetermined passenger defining area for the image; a passenger extracting step for extracting a passenger image from the passenger defining area of the image; a passenger presence determining step for determining whether a passenger is present or not based on an output of the passenger extracting step; an integrating step for determining whether a passenger is confined or not by integrating determination results of the door open/closed state determining step and the passenger presence determining step; and an alarming step for issuing an alarm to outside if a passenger has been confined, based on an output of the integrating step. Hence, a confined passenger in the closed space can be detected just from an image acquired by the image capturing device.

The door extracting step includes: a door highlighting step for highlighting a position of an edge of a door in the door defining area; a data time series storing step for successively storing in time series door edge position data emphasizing the position of the edge of the door; and a door operation extracting step for extracting an opening/closing operation of the door from the time series data, and the door open/closed state determining step determines whether the door is open or closed based on an output of the door operation extracting step. Hence, accuracy in determining whether a door is open or closed is improved, resulting in higher reliability of detection of a confined passenger.

The passenger extracting step includes: an image temporary storage step for temporarily saving a previous image; a comparing step for performing comparison between an image saved in the temporary storage step and an image acquired by the image acquiring step; and a difference pixel number counting step for counting a number of pixels of a difference between the two images based on an output of the comparing step, wherein the passenger presence determining step determines whether there is a passenger or not based on an output of the difference pixel number counting step. This arrangement allows accuracy in determining the presence of a passenger to be improved, leading to even higher reliability of detection of a confined passenger.

The image monitoring method further includes a destination floor recognizing step for recognizing a destination floor, and a door operation timing calculating step for calculating a time before the door is opened next based on an output of the destination floor recognizing step, wherein the integrating step determines that a passenger has been confined based on determination results of the door open/closed state determining step and the passenger presence determining step and if the door is not opened when the time is reached. This arrangement makes it possible to further improve accuracy in determining whether there is a confined passenger or not, leading to higher reliability of the monitor.

The image monitoring method according to a further aspect of the present invention is a method for monitoring an opening/closing door, including: an image acquiring step for acquiring an image including the door by an image capturing device provided so that it faces the door; a door area setting step for setting a predetermined door defining area for the image; a door extracting step for extracting a door image from the door defining area of the image; and a door operation evaluating step for detecting whether the door is open or closed based on an output of the door extracting step and outputting a detection signal to an external device. This arrangement allows a door opening/closing failure to be detected from an image acquired by the image capturing device, making it possible to obviate a dedicated sensor provided in the past to detect a door opening/closing failure.

The alarming step remotely issues an alarm to the image capturing device, so that monitoring for a confined passenger can be accomplished from a distance.

What is claimed is:

1. An image monitoring apparatus for monitoring an interior of a closed space having an opening/closing door, comprising:

image acquiring means provided in a closed space facing a door of the closed space to acquire an image of an interior of the closed space including the door;

door area defining means for setting a door defining area for the image;

door extracting means for extracting a door image from the door defining area of the image;

door open/closed state determining means for determining whether the door is open or closed based on an output of the door extracting means;

passenger area defining means for setting a passenger defining area for the image;

passenger extracting means for extracting a passenger image from the passenger defining area for the image;

passenger presence determining means for determining whether a passenger is present in the closed space based on an output of the passenger extracting means;

integrating means for determining whether a passenger is confined in the closed space by integrating determinations of the door open/closed state determining means and the passenger presence determining means; and alarming means for issuing an alarm if a passenger is confined in the closed space based on an output of the integrating means.

2. The image monitoring apparatus according to claim 1, wherein the door extracting means includes:

door highlighting means for highlighting a position of an edge of a door in the door defining area;

data time series storing means for successively storing in time series door edge position data emphasizing the position of the edge of the door; and door operation extracting means for extracting an opening/closing operation of the door from the time series data, wherein the door open/closed state determining means determines whether the door is open or closed based on an output of the door operation extracting means.

3. The image monitoring apparatus according to claim 1, wherein the passenger extracting means includes:

an image temporary storage memory for temporarily saving a previous image;

comparing means for comparing an image in the temporary storage memory and an image acquired by the image acquiring means; and difference pixel number counting means for counting a number of pixels that are different in the image in the temporary storage memory and the image acquired by the image acquiring means, based on an output of the comparing means, wherein the passenger presence determining means determines whether there is a passenger in the closed space based on an output of the difference pixel number counting means.

4. The image monitoring apparatus according to claim 1, further comprising:

destination floor recognizing means for recognizing a destination floor; and door operation timing calculating means for calculating a time before the door is next opened based on an output of the destination floor recognizing means, wherein the integrating means determines that a passenger has been confined in the closed space based on determinations of the door open/closed state determining means and the passenger presence determining means, if the door has not opened when the time is reached.

5. An image monitoring apparatus for monitoring an opening/closing door of an elevator car, comprising:

image acquiring means facing a door of the elevator car to acquire an image including the door;

door area defining means for setting a door defining area of the image;

door extracting means for extracting a door image from the door defining area of the image; and door operation evaluating means for detecting whether the door is open or closed based on an output of the door extracting means and outputting a detection signal to an external device.

6. The image monitoring apparatus according to claim 1, wherein the alarming means is located remotely from the image acquiring means.

7. An image monitoring method for monitoring an interior of a closed space having an opening/closing door, the method comprising:

acquiring an image of an interior of a closed space including a door with an image capturing device located in the closed space facing the door;

setting a door defining area for the image;

extracting a door image from the door defining area of the image;

determining whether the door is open or closed based on the door image extracted from the door defining area;

setting a passenger defining area for the image;

extracting a passenger image from the passenger defining area of the image;

determining whether a passenger is present based on the passenger image extracted from the image;

determining whether a passenger is confined in the closed space by integrating determinations as to whether the door is open or closed and whether a passenger is present in the closed space; and issuing an alarm if a passenger has been confined in the closed space based on whether the door is closed and a passenger is confined in the closed space.

8. The image monitoring method according to claim 7, wherein extracting a door image comprises:

highlighting a position of an edge of a door in the door defining area;

successively storing, in time series, door edge position data emphasizing the position of the edge of the door; and extracting an opening/closing operation of the door from the door edge position data, thereby determining step determines whether the door is open or closed.

9. The image monitoring method according to claim 7, wherein extracting a passenger image comprises:

temporarily saving a previous image;

comparing an image temporarily saved and an image acquired with the image capturing device; and counting the number of pixels between the images compared that are different, and determining whether a passenger is confined based on the number of pixels that are different.

10. The image monitoring method according to claim 7, further comprising:

recognizing a destination floor; and calculating a time before the door is next opened based on recognizing a destination floor, wherein determining that a passenger is confined in the closed space based on whether the door is open or closed and whether a passenger is present if the door has not opened when the time is reached.

11. The image monitoring method according to claim 7, including remotely issuing the alarm to the image capturing device.

* * * * *